US011413601B2

(12) United States Patent
Despen et al.

(10) Patent No.: US 11,413,601 B2
(45) Date of Patent: Aug. 16, 2022

(54) HALOGENATED ACTIVATED CARBON COMPOSITIONS AND METHODS OF MAKING AND USING SAME

(71) Applicant: Carbon Technology Holdings, LLC, Oakdale, MN (US)

(72) Inventors: Daniel J. Despen, Minneapolis, MN (US); James A. Mennell, Dellwood, MN (US)

(73) Assignee: Carbon Technology Holdings, LLC, Oakdale, MN (US)

( * ) Notice: Subject to any disclaimer, the term of this patent is extended or adjusted under 35 U.S.C. 154(b) by 33 days.

(21) Appl. No.: 14/922,829

(22) Filed: Oct. 26, 2015

(65) Prior Publication Data
US 2016/0114308 A1 Apr. 28, 2016

Related U.S. Application Data

(60) Provisional application No. 62/068,258, filed on Oct. 24, 2014.

(51) Int. Cl.
*B01J 20/20* (2006.01)
*B01D 53/02* (2006.01)
*B01D 53/64* (2006.01)
*B01J 20/04* (2006.01)
*B01J 20/02* (2006.01)

(52) U.S. Cl.
CPC ............ *B01J 20/20* (2013.01); *B01D 53/02* (2013.01); *B01D 53/64* (2013.01); *B01J 20/0203* (2013.01); *B01J 20/04* (2013.01); *B01J 20/046* (2013.01); *B01D 2251/304* (2013.01); *B01D 2251/306* (2013.01); *B01D 2251/402* (2013.01); *B01D 2251/404* (2013.01); *B01D 2251/60* (2013.01); *B01D 2253/102* (2013.01); *B01D 2253/112* (2013.01); *B01D 2253/25* (2013.01); *B01D 2253/306* (2013.01); *B01D 2253/308* (2013.01); *B01D 2253/31* (2013.01); *B01D 2253/311* (2013.01); *B01D 2255/2073* (2013.01); *B01D 2255/20738* (2013.01); *B01D 2255/20746* (2013.01); *B01D 2255/20753* (2013.01); *B01D 2255/20761* (2013.01); *B01D 2255/20769* (2013.01); *B01D 2255/20776* (2013.01); *B01D 2255/20792* (2013.01); *B01D 2257/55* (2013.01); *B01D 2257/60* (2013.01); *B01D 2257/602* (2013.01); *B01D 2257/708* (2013.01); *B01D 2258/06* (2013.01); *B01J 2220/42* (2013.01); *Y02E 50/30* (2013.01)

(58) Field of Classification Search
CPC ....................................................... B01J 20/20
See application file for complete search history.

(56) References Cited

U.S. PATENT DOCUMENTS

| | | | |
|---|---|---|---|
| 2,289,917 A | 7/1942 | Lambiotte | |
| 2,475,767 A | 7/1949 | Williams et al. | |
| 3,088,983 A | 5/1963 | Rosenthal | |
| 3,290,894 A | 12/1966 | Tsao | |
| 3,298,928 A | 1/1967 | Esterer | |
| 3,650,711 A | 3/1972 | Unick et al. | |
| 3,852,048 A | 12/1974 | Pyle | |
| 3,853,498 A | 12/1974 | Bailie | |
| 4,011,129 A | 3/1977 | Tomlinson | |
| 4,015,951 A | 4/1977 | Gunnetman | |
| 4,026,678 A | 5/1977 | Livingston | |
| 4,082,694 A | 4/1978 | Wennerberg | |
| 4,102,653 A | 7/1978 | Simmons et al. | |
| 4,149,994 A | 4/1979 | Murty | |
| 4,152,119 A | 5/1979 | Schulz | |
| 4,158,643 A * | 6/1979 | Sinha | B01D 53/62 502/150 |
| 4,210,423 A | 7/1980 | Yan | |
| 4,236,897 A | 12/1980 | Johnston | |
| 4,248,839 A * | 2/1981 | Toomey | C01F 5/32 373/117 |
| 4,308,033 A | 12/1981 | Gunnennan | |
| 4,324,561 A | 4/1982 | Dean et al. | |
| 4,385,905 A | 5/1983 | Tucker | |
| 4,395,265 A | 7/1983 | Reilly et al. | |
| 4,398,917 A | 8/1983 | Reilly | |
| 4,405,331 A | 9/1983 | Blaustein et al. | |
| 4,494,962 A | 1/1985 | Christie et al. | |
| 4,500,327 A * | 2/1985 | Nishino | B01D 53/02 502/406 |
| 4,529,407 A | 7/1985 | Johnston et al. | |

(Continued)

FOREIGN PATENT DOCUMENTS

CA 2740225 5/2010
CN 101693848 A 4/2010
(Continued)

OTHER PUBLICATIONS

PCT/US15/57370 International Search Report dated Jan. 8, 2016.
Andi Supangat et al., Method for producing activated carbon from combustion of e.g. bamboo, involves naturally removing and colling furnace material which is separate module of furnace fuel, but closing exhaust holes, when burning process is not sufficient, Mar. 1, 2012, ID 20121099A.
Antal et al., "The Art, Science and Technology of Charcoal Production," Ind. Eng. Chem. Res., 42:1619-1640 (2003).
Ayanda et al., "Activated Carbon-Fly Ash-Nanometal Oxide Composite Materials: Preparation, Characterization, and Tributyltin Removal Efficiency," Journal of Chemistry. vol. 2013 (2013).
(Continued)

*Primary Examiner* — Stuart L Hendrickson
(74) *Attorney, Agent, or Firm* — Perkins Coie LLP

(57) ABSTRACT

This disclosure provides a halogenated activated carbon composition comprising carbon, a halogenated compound and a salt. In some embodiments, the halogenated compound and the salt comprise a naturally occurring salt mixture, as may be obtained from ocean water, salt lake water, rock salt, salt brine wells, for example. In some embodiments, the naturally occurring salt mixture comprises Dead Sea salt.

6 Claims, 3 Drawing Sheets

(56) References Cited

U.S. PATENT DOCUMENTS

| | | | |
|---|---|---|---|
| 4,553,978 A | 11/1985 | Yvan | |
| 4,561,860 A | 12/1985 | Gulley et al. | |
| 4,632,731 A | 12/1986 | Bodle et al. | |
| 4,652,433 A | 3/1987 | Ashworth et al. | |
| 4,679,268 A | 7/1987 | Gurries et al. | |
| 4,810,255 A | 3/1989 | Fay, III et al. | |
| 4,810,446 A | 3/1989 | Sylvest | |
| 4,828,573 A | 5/1989 | Jelks | |
| 4,834,777 A | 5/1989 | Endebrock | |
| 4,886,519 A | 12/1989 | Hayes et al. | |
| 4,891,459 A | 1/1990 | Knight et al. | |
| 5,132,259 A * | 7/1992 | Curnutt | C07C 68/005 502/181 |
| 5,141,526 A | 8/1992 | Chu | |
| 5,153,242 A | 10/1992 | Timm et al. | |
| 5,167,797 A | 12/1992 | Ou | |
| 5,187,141 A | 2/1993 | Jha et al. | |
| 5,248,413 A * | 9/1993 | Stencel | C10B 53/00 201/8 |
| 5,336,835 A * | 8/1994 | McNamara | B01J 20/0288 502/417 |
| 5,338,441 A | 8/1994 | LeViness | |
| 5,342,418 A | 8/1994 | Jesse | |
| 5,346,876 A | 9/1994 | Ichimura et al. | |
| 5,352,252 A | 10/1994 | Tolmie | |
| 5,431,702 A | 7/1995 | Schulz | |
| 5,458,803 A | 10/1995 | Oehr | |
| 5,513,755 A | 5/1996 | Heavilon et al. | |
| 5,584,970 A | 12/1996 | Schmalfeld et al. | |
| 5,643,342 A | 7/1997 | Andrews | |
| 5,725,738 A | 3/1998 | Brioni et al. | |
| 5,910,440 A | 6/1999 | Grossman et al. | |
| 5,916,826 A | 6/1999 | White | |
| 5,976,373 A | 11/1999 | Trocciola et al. | |
| 5,980,595 A | 11/1999 | Andrews | |
| 6,039,774 A | 3/2000 | McMullen et al. | |
| 6,057,262 A | 5/2000 | Derbyshire et al. | |
| 6,114,280 A | 9/2000 | Stephens | |
| 6,342,129 B1 | 1/2002 | Vaughn et al. | |
| 6,447,437 B1 | 9/2002 | Lee et al. | |
| 6,506,223 B2 | 1/2003 | White | |
| 6,524,354 B2 | 2/2003 | Sinha et al. | |
| 6,698,724 B1 | 3/2004 | Traeger et al. | |
| 6,712,606 B2 | 3/2004 | Hagstrom et al. | |
| 6,719,816 B2 | 4/2004 | Barford | |
| 6,818,027 B2 | 11/2004 | Murcia | |
| 7,241,321 B2 | 7/2007 | Murcia | |
| 7,314,002 B2 | 1/2008 | Dupuis | |
| 7,326,263 B2 | 2/2008 | Andersen | |
| 7,354,566 B2 | 4/2008 | Okada et al. | |
| 7,378,372 B2 | 5/2008 | Sylvester | |
| 7,404,262 B2 | 7/2008 | Jurkovich et al. | |
| 7,438,785 B2 | 10/2008 | Meier et al. | |
| 7,879,136 B2 | 2/2011 | Mazyck | |
| 7,931,783 B2 | 4/2011 | Dam-Johansen | |
| 7,981,835 B2 | 7/2011 | Srinivasachar et al. | |
| 8,048,528 B2 | 11/2011 | Matviya | |
| 8,080,088 B1 | 12/2011 | Srinivasachar | |
| 8,309,052 B2 | 11/2012 | Jones | |
| 8,328,887 B2 | 12/2012 | Yang et al. | |
| 8,361,186 B1 | 1/2013 | Shearer et al. | |
| 8,425,633 B2 | 4/2013 | Banasiak | |
| 8,449,724 B2 | 5/2013 | Stromberg et al. | |
| 8,519,205 B2 | 8/2013 | Frey | |
| 8,563,467 B2 | 10/2013 | Hashisho et al. | |
| 8,637,055 B2 * | 1/2014 | Maor | A61K 8/02 424/401 |
| 8,920,525 B2 * | 12/2014 | Despen | C10L 5/363 44/500 |
| 8,993,478 B2 | 3/2015 | Fujii et al. | |
| 9,108,186 B2 | 8/2015 | Satterfield | |
| 9,388,046 B2 | 7/2016 | Mennell et al. | |
| 9,388,355 B2 | 7/2016 | Mennell et al. | |
| 9,724,667 B2 | 8/2017 | Mennell et al. | |
| 10,174,267 B2 | 1/2019 | Mennell et al. | |
| 2001/0009125 A1 | 7/2001 | Monereau et al. | |
| 2002/0038058 A1 | 3/2002 | Holtzapple et al. | |
| 2002/0048144 A1 | 4/2002 | Sugo et al. | |
| 2002/0050094 A1 | 5/2002 | Taulbee | |
| 2002/0194779 A1 | 12/2002 | Barford | |
| 2003/0154858 A1 | 8/2003 | Kleut et al. | |
| 2003/0221363 A1 | 12/2003 | Reed | |
| 2004/0045215 A1 | 3/2004 | Guilfoyle | |
| 2004/0079262 A1 | 4/2004 | Hornung et al. | |
| 2004/0178052 A1 | 9/2004 | Antal | |
| 2005/0095183 A1 | 5/2005 | Rehmat et al. | |
| 2005/0142250 A1 | 6/2005 | Garwood | |
| 2005/0258093 A1 | 11/2005 | Cueman et al. | |
| 2005/0274068 A1 | 12/2005 | Morton et al. | |
| 2005/0279696 A1 | 12/2005 | Bahm et al. | |
| 2006/0048646 A1 | 3/2006 | Olson et al. | |
| 2006/0093713 A1 | 5/2006 | Jurkovich et al. | |
| 2006/0120934 A1 | 6/2006 | Lanier et al. | |
| 2006/0130396 A1 | 6/2006 | Werner | |
| 2006/0228282 A1 | 10/2006 | Zhou et al. | |
| 2006/0280669 A1 | 12/2006 | Jones | |
| 2007/0006526 A1 | 1/2007 | Cullen | |
| 2007/0028510 A1 | 2/2007 | Dupuis | |
| 2007/0034126 A1 | 2/2007 | Chen et al. | |
| 2007/0140941 A1 | 6/2007 | Comrie | |
| 2007/0168213 A1 | 7/2007 | Comrie | |
| 2007/0209923 A1 | 9/2007 | Flottvik | |
| 2007/0220805 A1 | 9/2007 | Leveson et al. | |
| 2007/0261295 A1 | 11/2007 | Tolmie | |
| 2007/0266623 A1 | 11/2007 | Paoluccio | |
| 2008/0087165 A1 | 4/2008 | Andersen | |
| 2008/0153143 A1 | 6/2008 | Schorken et al. | |
| 2008/0172933 A1 | 7/2008 | Drisdelle et al. | |
| 2008/0197012 A1 | 8/2008 | Berruti et al. | |
| 2008/0207442 A1 | 8/2008 | Pfeifer et al. | |
| 2009/0056205 A1 | 3/2009 | Gauthier et al. | |
| 2009/0084029 A1 | 4/2009 | Bergman | |
| 2009/0126433 A1 | 5/2009 | Piskorz et al. | |
| 2009/0139851 A1 | 6/2009 | Freel | |
| 2009/0151251 A1 | 6/2009 | Manzer et al. | |
| 2009/0188160 A1 | 7/2009 | Liu | |
| 2009/0205546 A1 | 8/2009 | Kluko | |
| 2009/0221866 A1 | 9/2009 | Stone et al. | |
| 2009/0314185 A1 | 12/2009 | Whellock | |
| 2009/0317320 A1 | 12/2009 | Srinivasachar | |
| 2010/0059449 A1 | 3/2010 | Grass et al. | |
| 2010/0101141 A1 | 4/2010 | Shulenberger et al. | |
| 2010/0112242 A1 | 5/2010 | Medoff | |
| 2010/0139155 A1 | 6/2010 | Mennell et al. | |
| 2010/0139156 A1 | 6/2010 | Mennell et al. | |
| 2010/0178624 A1 | 7/2010 | Srinivasachar | |
| 2010/0228062 A1 | 9/2010 | Babicki et al. | |
| 2010/0257775 A1 | 10/2010 | Cheiky | |
| 2010/0273899 A1 | 10/2010 | Winter | |
| 2011/0002086 A1 | 1/2011 | Feaver et al. | |
| 2011/0011721 A1 | 1/2011 | Champagne | |
| 2011/0041392 A1 | 2/2011 | Stromberg et al. | |
| 2011/0071022 A1 | 3/2011 | Bandosz et al. | |
| 2011/0132737 A1 | 6/2011 | Jadhav | |
| 2012/0021123 A1 | 1/2012 | Leveson et al. | |
| 2012/0125064 A1 | 5/2012 | Joseph et al. | |
| 2012/0172216 A1 | 7/2012 | Boehringer et al. | |
| 2012/0174475 A1 | 7/2012 | Mennell et al. | |
| 2012/0174476 A1 | 7/2012 | Mennell et al. | |
| 2012/0285080 A1 | 11/2012 | Despen et al. | |
| 2013/0145684 A1 | 6/2013 | Mennell et al. | |
| 2013/0152461 A1 | 6/2013 | Mennell et al. | |
| 2014/0075832 A1 | 3/2014 | Mennell et al. | |
| 2014/0075834 A1 | 3/2014 | Mennell et al. | |
| 2014/0101992 A1 | 4/2014 | Mennell et al. | |
| 2014/0110240 A1 | 4/2014 | Mennell et al. | |
| 2014/0338576 A1 | 11/2014 | Mennell et al. | |
| 2015/0075326 A1 | 3/2015 | Despen et al. | |
| 2015/0126362 A1 | 5/2015 | Mennell et al. | |
| 2015/0144831 A1 | 5/2015 | Mennell et al. | |
| 2015/0196893 A1 | 7/2015 | Mennell et al. | |
| 2015/0196896 A1 | 7/2015 | Mennell et al. | |
| 2015/0197424 A1 | 7/2015 | Mennell et al. | |

(56) References Cited

U.S. PATENT DOCUMENTS

| | | |
|---|---|---|
| 2016/0114308 A1 | 4/2016 | Despen et al. |
| 2016/0280554 A1 | 9/2016 | Despen et al. |
| 2017/0037333 A1 | 2/2017 | Mennell et al. |
| 2017/0037334 A1 | 2/2017 | Mennell et al. |
| 2018/0127672 A1 | 5/2018 | Mennell et al. |

FOREIGN PATENT DOCUMENTS

| | | |
|---|---|---|
| CN | 101805626 A | 8/2010 |
| DE | 202009010612 | 10/2009 |
| EP | 0930091 | 7/1999 |
| GB | 1412407 | 11/1975 |
| GB | 2460064 | 11/2009 |
| JP | S47-013408 | 4/1972 |
| JP | S60-238144 | 11/1985 |
| JP | H0564789 | 3/1993 |
| JP | 06-88077 | 3/1994 |
| JP | 10-208985 | 8/1998 |
| JP | 2000-212568 | 8/2000 |
| JP | 2000-265186 | 9/2000 |
| JP | 2001-300497 | 10/2001 |
| JP | 2002-211911 | 7/2002 |
| JP | 2002-226865 | 8/2002 |
| JP | 2002-255796 | 9/2002 |
| JP | 2002-289683 | 10/2002 |
| JP | 2003-038941 | 2/2003 |
| JP | 2003-213273 | 7/2003 |
| JP | 2003-238136 | 8/2003 |
| JP | 2003-251398 | 9/2003 |
| JP | 2003-286021 | 10/2003 |
| JP | 2004-912 | 1/2004 |
| JP | 2005-263547 | 9/2005 |
| JP | 2005-298602 | 10/2005 |
| JP | 2006-315899 | 11/2006 |
| JP | 2008-037931 | 2/2008 |
| JP | 2008-222901 | 9/2008 |
| JP | 2009-125070 | 6/2009 |
| JP | 2010-194502 | 9/2010 |
| JP | 2010-202298 | 9/2010 |
| JP | 2010-222474 | 10/2010 |
| JP | 2011-230038 | 11/2011 |
| JP | 2011-240329 | 12/2011 |
| JP | 2006-96615 | 12/2012 |
| WO | WO 2002/069351 | 9/2002 |
| WO | WO 2005/049530 | 6/2005 |
| WO | WO 2006/122405 | 11/2006 |
| WO | WO 2007/147244 | 12/2007 |
| WO | WO 2008/022461 | 2/2008 |
| WO | WO 2008/076944 | 6/2008 |
| WO | WO 2008/144416 | 11/2008 |
| WO | WO 2009/018469 | 2/2009 |
| WO | WO 2009/105441 | 8/2009 |
| WO | WO 2010/110470 | 9/2010 |
| WO | WO 2010/128055 | 11/2010 |
| WO | WO 2010/132970 | 11/2010 |
| WO | WO 2011/053668 | 5/2011 |
| WO | WO 2011/119961 | 9/2011 |
| WO | WO 2011/162727 | 12/2011 |
| WO | WO 2012/142486 | 10/2012 |
| WO | WO 2012/142488 | 10/2012 |
| WO | WO 2012/142489 | 10/2012 |
| WO | WO 2012/142491 | 10/2012 |
| WO | WO 2013/169803 | 11/2013 |
| WO | WO 2013/169806 | 11/2013 |
| WO | WO 2013/169811 | 11/2013 |
| WO | WO 2013/187940 | 12/2013 |
| WO | WO 2015/061701 | 4/2015 |
| WO | WO 2015/109206 | 7/2015 |
| WO | WO 2015/127460 | 8/2015 |
| WO | WO 2016/065357 | 4/2016 |

OTHER PUBLICATIONS

Baldock, "Chemical composition and bioavailability ofthermally altered *Pinus resinosa* (Red pine) wood," Org. Geochem., vol. 33(9), pp. 1093-1109 (2002).

Brodowski, "Morphological and Chemical Properties of Black Carbon in Physical Soil Fractions as Revealed by Scanning Electron Microscopy and Energy-Dispersive X-ray Spectroscopy," Geoderma, vol. 128, pp. 116-129 (2005).

Cheng et al., "Oxidatin of black carbon by biotic and abiotic processes," Organic Geochemistry 37:1477-1488 (2006).

Demirbas, "Effects of Temperature and Particle Size on Bio-Char Yield from Pyrolysis of Agricultural Residues," J. Anal. Appl. Pyrolysis, vol. 72, pp. 243-248 (2004).

Di Felice et al., "Biomass Gasification with Catalytic Tar Reforming: A Model Study into Activity Enhancement of Calcium- and Magnesium-Oxide-Based Catalytic Materials by Incorporation of Iron," Energy Fuels 2010, vol. 24, pp. 4034-4045.

Du, "Some Thoughts on the Chemical Compositions of Fly Ash: ICAR's 17th Annual Symposium. The University of Texas at Austin," (2009).

Edgehill et al. (1998, Adsorption Characteristics of Carbonized Bark for Phenal and Pentachlorophenol).

Freese et al. (2000, Powdered Activated Carbon: Can This Be Effectively Assessed in the Laboratory).

Gupta et al., "Utilisation of bagasse fly ash (a sugar industry waste) for the removal of copper and zinc from wasterwater," Separation and Purification Technology Journal. vol. 18, Issue 2, pp. 131-140 (2000).

Hamer, "Interactive Priming of Black Carbon and Glucose Mineralisation," Org. Geochem., vol. 35, pp. 823-830 (2004).

Hardman et al., "Studies of Spontaneous Combustion in Beds of Activated Carbon," Fuel, IPC Science and Technology Press, vol. 59, No. 3, pp. 151-156 (Mar. 1980).

Hung, "The Production of Activated Carbon from Coconut Shells Using Pyrolysis and Fluidized Bed Reactors. A Thesis Submitted to the Honors College." The University of Arizona, May 2012, [retrieved on May 4, 2015][retrieved from the internet] <URL:http://arizona/openrepository.com/arizona/bitstream/10150/243968/1/azu_etd_mr_2012_0079_sip1_m.pdf> Abstract, pp. 8, 9, 12, 31-33.

Hwang et al., "Characterization of char derived from various types of solid wastes from the standpoint of fuel recovery and pretreatment before landfilling.," Waste Management (Aug. 22, 2006) 27(9):1155-1166.

Iqbaldin et al., "Properties of coconut shell activated carbon," Journ. Tropical Forest Science, 25(4):497-503 (2013).

Jha et al., "Sorption properties of the activated carbon-zeolite composite prepared from coal fly ash for Ni(2+), Cu(2+), Cd(2+) and Pb(2+)," Journal of Hazardous Materials. vol. 160, Issue 1 (2008).

Kuzyakov, "Black Carbon Decomposition and Incorporation Into Soil Microbial Biomass Estimated by 14C Labeling," Soil Bio & Biochem., vol. 4, pp. 210-219 (2009).

Lakdawala et al., "The effect of low cost material Bagasse Fly ash to the removal of COD Contributing component of combined waste water of Sugar Industry," Scholars Research Library (2012).

Lehmann, "Bio-energy in the black," Front. Ecol. Enviorn., vol. 5(7), pp. 381-387 (2007).

Mackay, "The Dependence of Char and Carbon Yield on Lignocellulosic Precursor Composition," Carbon, col. 20(2), pp. 87-94 (1982).

Martin et al., "Gasification and Production of Biochar from Wastewater Grown Algae," Water New Zealand Annual Conference, Sep. 22-24, 2010, XP055337229, Retrieved from the Internet: URL:https://www.waternz.org.nz/Attachment?Action=Download&Attachment_id=1127 [retrieved on Jan. 20, 2017].

Novack, "Impact of Biochar Amendment on Fertility of a Southeastern Coastal Plain Soil," Soil Sci., vol. 174(2), pp. 105-112 (Feb. 2009).

PCT/US2009/069133 International Search Report and Written Opinion dated Jul. 26, 2011.

(56) References Cited

OTHER PUBLICATIONS

PCT/US2009/069403 International Search Report and Written Opinion dated Jul. 26, 2011.
PCT/US2012/033624 International Search Report dated Sep. 17, 2012.
PCT/US2012/033627 International Search Report dated Jul. 13, 2012.
PCT/US2012/033628 International Search Report dated Jul. 6, 2012.
PCT/US2012/033630 International Search Report dated Aug. 21, 2012.
PCT/US2012/033630 Written Opinion dated Aug. 21, 2012.
PCT/US2013/039981 International Search Report dated Oct. 22, 2013.
PCT/US2013/039986 International Search Report dated Oct. 26, 2013.
PCT/US2013/039991 International Search Report dated Dec. 16, 2013.
PCT/US2014/062202 International Search Report and Written Opinion dated Feb. 3, 2015.
PCT/US2015/011787 International Search Report dated Jun. 11, 2015.
PCT/US2015/017351 International Search Report dated May 15, 2015.
Purnomo et al., "Preparation and characterization of activated carbon from bagasse fly ash," Journal of Analytical and Applied Pyrolysis. vol. 91 (2011).
Saravanakumar et al., "Experimental investigations of long stick wood gasification in a bottom lit updraft fixed bed gasifier," Fuel Processing Technology, 88:617-622 (2007).
Shinogi et al., "Pyrolysis of plant, animal and human waste: physical and chemical characterization of the pyrolytic products," Bioresource Technology 90:241-247 (2003).
Tay et al., "Preparation and characterization of activated carbon from waste biomass," Journal of Hazardous Materials ND (Jun. 15, 2009) 165(1-3):481-485.
Ueda, Shigeru et al., "Improvement of Reactivity of Carbon Iron Ore Composite with Biomass Char for Blast Furnace" ISIJ International (2009) 49(10):1505-1512.
Yan et al., "Thermal Pretreatment of Lignocellulosic Biomass," Environmental Progress and Sustainable Energy, vol. 28, No. 3, pp. 435-440, Oct. 2009.
Horst-Günter Brocksiepe et al., "Charcoal," Ullmann, 8:93-98 (epublication date: Jun. 15, 2000).
Khan et al., "Removal of trace elements from Thar coal to minimize its hazardous effect on the environment," Journal of Himalayan Earth Sciences 49(1):50-57 (2016).

\* cited by examiner

HALOGENATED ACTIVATED CARBON COMPOSITIONS AND METHODS OF MAKING AND USING SAME

PRIORITY DATA

This application claims priority to U.S. Provisional Patent Application Ser. No. 62/068,258, filed Oct. 24, 2014, the entire contents of which is incorporated herein by reference and relied upon.

FIELD

The present disclosure generally relates to halogenated biogenic activated carbon compositions and methods.

BACKGROUND

Activated carbon was first produced commercially at the beginning of the 20th century and was used initially to decolorize sugar, then later to remove taste and odor from water. Granular activated carbon was first developed for gas masks and has been used subsequently for a variety of additional purposes such as solvent recovery and air purification. Processes to produce activated carbon generally require large energy inputs and suffer from low yields. Most processes require two distinct steps: pyrolysis of the carbonaceous raw material followed by activation of the pyrolyzed solids. Pyrolysis typically involves directly heating the carbonaceous substrate in a low-oxygen environment. Activation generally involves application of steam or carbon dioxide to increase surface area of the pyrolyzed solids.

Mercury emissions from coal-fired power plants are the subject of governmental regulation. The control of mercury emissions is complicated by the several forms mercury may take within combustion flue gases. For example, at combustion temperatures, mercury is present in flue gases in its elemental form, $Hg^0$, which may be difficult to control because it is easily volatized and is unreactive. Mercury reacts with carbon as flue gases cool below 550° C., and such reactions may convert mercury to its highly reactive, oxidized form, $Hg^{2+}$. Mercury may also be absorbed in fly ash and/or other flue gas particles to form particulate-bound mercury.

Despite its promise, the cost of using activated carbon for mercury control has been high. A more efficient activated carbon composition is needed for controlling mercury and other emissions in an economic way. Improved processes to produce these activated carbon products are also currently needed.

SUMMARY

In some embodiments, the disclosure provides a halogenated activated carbon composition, the composition comprising, on a dry basis, at least 85 wt % carbon; a halogenated compound; and a salt, wherein the halogenated compound and the salt are present in a total amount of about 0.1 wt % to about 15 wt %. In some embodiments, the halogenated compound and/or the salt comprises at least two halogens or salts thereof. In some embodiments, at least a portion of the carbon comprises biogenic carbon (e.g., carbon derived from a feedstock comprising biomass).

In some embodiments, the halogenated compound may be a salt, such as a metal halide. In other embodiments, the halogenated compound may be a molecular halogen (e.g., molecular bromine, $Br_2$) or a halocarbon (e.g., chloroform, $CHCl_3$).

In some embodiments, the halogenated activated carbon composition comprises at least 90 wt % carbon or at least 95 wt % carbon. In some embodiments, the halogenated compound and the salt are present in a total amount of about 1 wt % to about 10 wt %.

In some embodiments, the halogenated activated carbon comprises two or more salts selected from the group consisting of magnesium chloride, potassium chloride, sodium chloride, and calcium chloride.

The halogenated compound and/or the salt includes at least one anion selected from the group consisting of chloride, bromide, iodide, fluoride, sulfate, nitrate, and phosphate. In some embodiments, the halogenated compound and/or the salt comprises at least two anions selected from the group consisting of chloride, bromide, iodide, fluoride, sulfate, nitrate, and phosphate. For example, the halogenated compound and/or the salt may include ferric chloride sulfate, $FeClSO_4$.

In some embodiments, the halogenated compound and/or the salt also includes at least one cation selected from the group consisting of magnesium, potassium, calcium, sodium, ammonium, copper, cobalt, nickel, manganese, iron, zinc, molybdenum, and tungsten. In some embodiments, the halogen compound and/or the salt comprises at least two cations selected from the group consisting of magnesium, potassium, calcium, sodium, ammonium, copper, cobalt, nickel, manganese, iron, zinc, molybdenum, and tungsten.

In some preferred embodiments, the halogenated compound and/or the salt comprises a naturally occurring salt mixture, or is derived from a naturally occurring salt mixture. A naturally occurring salt mixture may be obtained from ocean water, salt lake water, rock salt, salt brine wells, or combinations thereof, for example. Naturally occurring salt mixtures typically contain various minerals, in addition to salts.

In some embodiments, the naturally occurring salt mixture comprises, consists essentially of, or consists of Dead Sea salt. In certain embodiments, the naturally occurring salt mixture comprises, consists essentially of, or consists of Dead Sea salt and Great Salt Lake salt, or Dead Sea salt and sea salt derived from ocean water.

In some embodiments, the halogenated compound and/or the salt includes about 10 wt % to about 90 wt % magnesium chloride, such as about 25 wt % to about 40 wt % magnesium chloride. In some embodiments, the halogenated compound and/or the salt includes about 5 wt % to about 75 wt % potassium chloride, such as about 15 wt % to about 35 wt % potassium chloride. In these or other embodiments, the halogenated compound and/or the salt includes about 1 wt % to about 25 wt % sodium chloride, such as about 2 wt % to about 10 wt % sodium chloride.

In some embodiments, the halogenated compound and/or the salt includes magnesium chloride ($MgCl_2$), potassium chloride (KCl), and sodium chloride (NaCl), wherein the weight ratio of ($MgCl_2$+KCl)/NaCl is at least about 5 or at least about 10.

In some embodiments, the halogenated compound and/or the salt includes from about 0.1 wt % to about 5 wt % bromide ions, such as about 0.2 wt % to about 2 wt % bromide ions. In some embodiments, the halogenated compound and/or the salt includes about 0.01 wt % to about 1 wt % sulfate ions, such as about 0.01 wt % to about 0.5 wt % sulfate ions.

Other embodiments provide a biogenic activated carbon composition comprising, on a dry basis:
  80 wt % or more total carbon;
  10 wt % or less hydrogen; and
  about 0.1 wt % to about 10 wt % of at least one anion selected from the group consisting of chloride, bromide, iodide, fluoride, sulfate, nitrate, phosphate, and combinations thereof.

In some embodiments, the composition comprises, on a dry basis, about 0.5 wt % to about 10 wt % of the at least one anion, such as about 2 wt % to about 8 wt % of the at least one anion.

Other embodiments provide a biogenic activated carbon composition comprising, on a dry basis:
  80 wt % or more total carbon;
  10 wt % or less hydrogen; and
  about 0.1 wt % to about 10 wt % of at least one cation selected from the group consisting of magnesium, potassium, calcium, sodium, ammonium, copper, cobalt, nickel, manganese, iron, zinc, molybdenum, tungsten, and combinations thereof.

In some embodiments, the composition comprises, on a dry basis, about 0.5 wt % to about 10 wt % of the at least one cation, such as about 2 wt % to about 8 wt % of the at least one cation.

Other embodiments provide a biogenic activated carbon composition comprising, on a dry basis:
  80 wt % or more total carbon;
  10 wt % or less hydrogen; and
  a halogenated compound comprising a salt selected from the group consisting of magnesium chloride, potassium chloride, sodium chloride, calcium chloride, and combinations thereof; and a salt, wherein the halogenated compound and the salt are present in a total amount of about 0.2 wt % to about 20 wt %.

In some embodiments, the halogenated compound and the salt are present in a total amount, on a dry basis, of about 1 wt % to about 15 wt %, such as about 2 wt % to about 10 wt %.

In some embodiments, the halogenated compound and/or the salt includes about 10 wt % to about 90 wt % magnesium chloride, such as from about 25 wt % to about 40 wt % magnesium chloride. In some embodiments, the halogenated compound includes about 5 wt % to about 75 wt % potassium chloride, such as about 15 wt % to about 35 wt % potassium chloride. In some embodiments, the halogenated compound and/or the salt includes about 1 wt % to about 25 wt % sodium chloride, such as about 2 wt % to about 10 wt % sodium chloride. In some embodiments, the halogenated compound and/or the salt includes magnesium chloride ($MgCl_2$), potassium chloride (KCl), and sodium chloride (NaCl), and wherein the weight ratio of ($MgCl_2$+KCl)/NaCl is at about least 5, at least about 6, at least about 7, at least about 8, at least about 9, or at least 10.

In some embodiments, the halogenated compound and/or the salt includes about 0.1 wt % to about 5 wt % bromide ions, such as about 0.2 wt % to about 2 wt % bromide ions, in some embodiments. In some embodiments, the halogenated compound and/or the salt includes about 0.01 wt % to about 1 wt % sulfate ions, such as about 0.01 wt % to about 0.5 wt % sulfate ions.

In some embodiments, the halogenated compound and/or the salt may comprise, consist essentially of, or consist of a naturally occurring salt mixture, such as (but not limited to) a salt mixture or a derivative thereof obtained from ocean water, salt lake water, rock salt, salt brine wells, or combinations thereof. In some embodiments, the naturally occurring salt mixture comprises, consists essentially of, or consists of Dead Sea salt. In other embodiments, the naturally occurring salt mixture comprises, consists essentially of, or consists of Dead Sea salt and Great Salt Lake salt or Dead Sea salt and sea salt derived from ocean water.

The present disclosure provides an activated carbon product comprising activated carbon (which may comprise, consist essentially of, or consist of biogenic activated carbon) and Dead Sea salt. The present disclosure also provides an activated carbon product consisting essentially of activated carbon (which may comprise, consist essentially of, or consist of biogenic activated carbon) and Dead Sea salt. In some embodiments, an activated carbon product comprises, consists essentially of, or consists of activated carbon, Dead Sea salt, and Great Salt Lake salt.

In some embodiments, the disclosure provides a process for producing a halogenated activated carbon composition, the process comprising:
  (a) providing a starting carbon-containing feedstock;
  (b) converting the feedstock to an activated carbon intermediate;
  (c) combining the activated carbon intermediate, during step (b) or following step (b), with at least two halogens or salts thereof, to form a mixture; and
  (d) recovering a halogenated activated carbon composition from the mixture,
  wherein the halogenated activated carbon composition comprises, on a dry basis, at least 85 wt % carbon and about 0.1 wt % to about 15 wt % of the at least two halogens or salts thereof.

The at least two halogens or salts thereof may be introduced in solid form, dissolved or suspended in liquid solution, in a vapor or mist, or any combinations of the foregoing. In some embodiments, the at least two halogens or salts thereof are introduced as an aqueous solution, followed by evaporating water to generate a dried form of the mixture.

During step (c), in some embodiments, a chemical reaction or physical reaction may occur between the activated carbon intermediate and one or more of the at least two halogens or salts thereof.

In some embodiments, the process of step (b) further comprises the substeps of:
  (i) in one or more indirectly heated reaction zones, mechanically countercurrently contacting the feedstock with a vapor stream comprising a substantially inert gas and an activation agent comprising at least one of water or carbon dioxide, to generate solids, condensable vapors, and non-condensable gases, wherein the condensable vapors and the non-condensable gases enter the vapor stream;
  (ii) removing at least a portion of the vapor stream from the reaction zone(s), to generate a separated vapor stream;
  (iii) recycling at least a portion of the separated vapor stream, or a thermally treated form thereof, to substep (i); and
  (iv) recovering at least a portion of the solids from the reaction zone(s) as the activated carbon intermediate.

During substep (iii), at least a portion of the separated vapor stream may be thermally oxidized, generating oxidation heat that is then utilized, at least in part, to dry the activated carbon intermediate.

Some embodiments provide a process for producing a halogenated activated carbon composition, the process comprising:
  (a) providing a starting carbon-containing feedstock;
  (b) combining the feedstock with at least two halogens or salts thereof;

(c) converting the feedstock, combined with the at least two halogens or salts thereof, to a halogenated activated carbon composition; and (d) recovering the halogenated activated carbon composition, wherein the halogenated activated carbon composition comprises, on a dry basis, at least 85 wt % carbon and about 0.1 wt % to about 15 wt % of the at least two halogens or salts thereof.

The at least two halogens and/or salts thereof may be introduced in solid form, dissolved or suspended in liquid solution, in a vapor or mist, or any combinations of the foregoing. In some embodiments, during step (c), a chemical reaction or physical reaction occurs between the feedstock and one or more of the at least two halogens or salts thereof.

In some embodiments, the process of step (c) may further include the substeps of:

(i) in one or more indirectly heated reaction zones, mechanically countercurrently contacting the feedstock with a vapor stream comprising a substantially inert gas and an activation agent comprising at least one of water or carbon dioxide, to generate solids, condensable vapors, and non-condensable gases, wherein the condensable vapors and the non-condensable gases enter the vapor stream;

(ii) removing at least a portion of the vapor stream from the reaction zone(s), to generate a separated vapor stream;

(iii) recycling at least a portion of the separated vapor stream, or a thermally treated form thereof, to substep (i); and (iv) recovering at least a portion of the solids from the reaction zone(s) as the halogenated activated carbon composition.

During substep (iii), at least a portion of the separated vapor stream may be thermally oxidized, generating oxidation heat that is then utilized, at least in part, dry the halogenated activated carbon composition.

Any of these processes may be a continuous, semi-continuous, or batch.

The carbon-containing feedstock preferably includes biomass, such as biomass is selected from the group consisting of softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, *miscanthus*, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, lignin, animal manure, municipal solid waste, municipal sewage, and combinations thereof.

In some embodiments, the halogen compound(s) utilized in these processes comprises, consists essentially of, or consists of a naturally occurring salt mixture, such as (but not limited to) naturally occurring salt mixtures derived from a source selected from the group consisting of ocean water, salt lake water, rock salt, salt brine wells, and combinations thereof. In these or other embodiments, the halogen compound(s) comprises a recycled salt obtained after use of the halogenated activated carbon composition (such as following combustion of the activated carbon). In other embodiments, the halogen compound(s) may be obtained from a mixture of halogenated species, such as crude halogen mixtures obtained from industrial processes (e.g., salt-containing wastes or byproducts). In some embodiments, a process of producing a halogenated activated carbon composition comprises adding the halogens or salts thereof as a mixture of halogenated species. In other embodiments, a process of producing a halogenated activated carbon composition comprises adding the halogens or salts thereof as pure or substantially pure halogen species or salts thereof.

The present disclosure provides activated carbon products produced by any of the disclosed processes, and apparatus configured to carry out any of the disclosed processes. The present disclosure also provides methods of using the activated carbon compositions or products for one or more applications selected from the group consisting of emissions control, mercury removal, water purification, groundwater treatment, wastewater treatment, removal of odor-producing or taste-producing compounds from a liquid, energy storage, energy transfer, capacitance, ion storage, and ion transfer.

DETAILED DESCRIPTION

Figure 1:
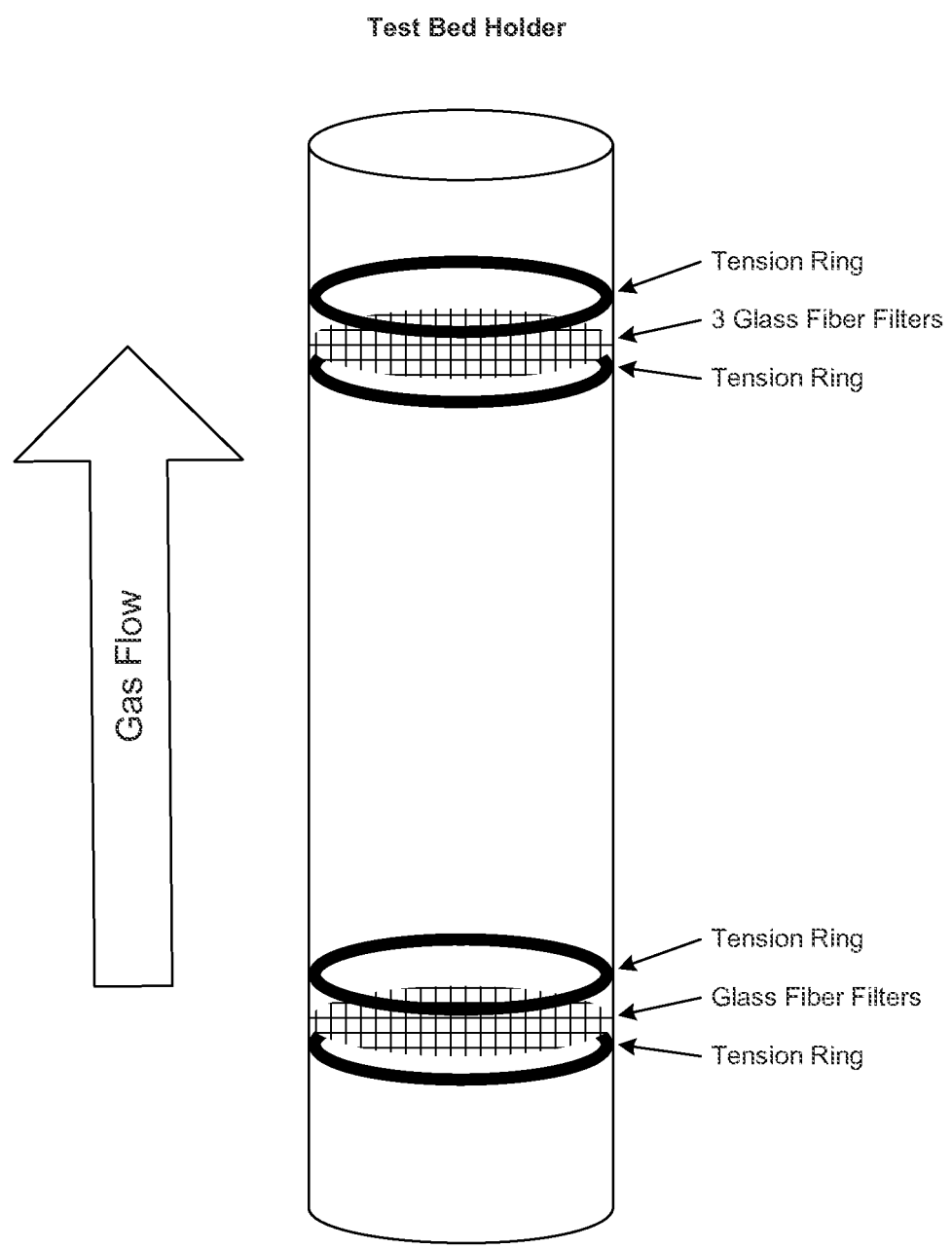
FIG. 1 is a representative view of a test bed holder apparatus configured according to one embodiment of the present disclosure.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this disclosure belongs.

Unless otherwise indicated, all numbers expressing reaction conditions, stoichiometries, concentrations of components, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

"Pyrolysis" and "pyrolyze" generally refer to thermal decomposition of a carbonaceous material. In pyrolysis, less oxygen is present than is required for complete combustion of the material, such as less than 10%, less than 5%, less than 1%, less than 0.5%, less than 0.1%, or less than 0.01% of the oxygen that is required for complete combustion. In some embodiments, pyrolysis is performed in the absence of oxygen.

For present purposes, "biogenic" is intended to mean a material (whether a feedstock, product, or intermediate) that includes an element, such as carbon, that is renewable on time scales of months, years, or decades. Non-biogenic materials may be non-renewable, or may be renewable on time scales of centuries, thousands of years, millions of years, or even longer geologic time scales. Note that a biogenic material may include a mixture of biogenic and non-biogenic sources.

For present purposes, "reagent" is intended to mean a material in its broadest sense; a reagent may be a fuel, a chemical, a material, a compound, an additive, a blend component, a solvent, and so on. A reagent is not necessarily a chemical reagent that causes or participates in a chemical reaction. A reagent may or may not be a chemical reactant; it may or may not be consumed in a reaction. A reagent may be a chemical catalyst for a particular reaction. A reagent may cause or participate in adjusting a mechanical, physical, or hydrodynamic property of a material to which the reagent may be added. For example, a reagent may be introduced to a metal to impart certain strength properties to the metal. A reagent may be a substance of sufficient purity (which, in the current context, is typically carbon purity) for use in chemical analysis or physical testing.

The biogenic activated carbon will have relatively high carbon content as compared to the initial feedstock utilized to produce the biogenic activated carbon. A biogenic activated carbon as provided herein will normally contain greater than about half its weight as carbon, since the typical carbon content of biomass is no greater than about 50 wt %. More typically, but depending on feedstock composition, a biogenic activated carbon will contain at least 55 wt %, at least 60 wt %, at least 65 wt %, at least 70 wt %, at least 75 wt %, at least 80 wt % 85 wt %, or at least 90 wt % carbon.

Notwithstanding the foregoing, the term "biogenic activated carbon" is used herein for practical purposes to consistently describe materials that may be produced by processes and systems of the disclosure, in various embodiments. Limitations as to carbon content, or any other concentrations, shall not be imputed from the term itself but rather only by reference to particular embodiments and equivalents thereof. For example it will be appreciated that a starting material having very low initial carbon content, subjected to the disclosed processes, may produce a biogenic activated carbon that is highly enriched in carbon relative to the starting material (high yield of carbon), but nevertheless relatively low in carbon (low purity of carbon), including less than 50 wt % carbon.

As used herein, the term "halogenated compound" refers to a halogen allotrope, a compound, a salt or a mineral that includes at least one halogen anion (e.g., fluoride, chloride, bromide, iodide, or a combination thereof), or a mixture of more than one such compound, salt or mineral.

As used herein, the term "salt" refers to an ionic compound and/or a mineral including a mixture of cations and anions, or a mixture of more than one such ionic compound and/or minerals. In some embodiments, the salt includes an ionic compound and/or a mineral that includes at least one halogen anion.

Some embodiments are premised on the surprising discovery that incorporating halogen compounds and/or salts into activated carbon produces a halogenated activated carbon composition that is particularly effective for mercury control and other applications. Some embodiments utilize crude sources of halogen compounds and/or salts, such as naturally occurring salt mixtures, rather than purified salts or other additives.

In some embodiments, the disclosure provides a halogenated activated carbon composition, the composition comprising, on a dry basis, at least 75 wt %, 80 wt %, 85 wt %, or 90 wt % carbon, a halogenated compound, and a salt, wherein the halogenated compound and the salt are present in a total amount of about 0.1 wt % to about 20 wt %.

In some embodiments, the halogenated activated carbon composition comprises at least 90 wt % carbon or at least 95 wt % carbon. Some or all of the carbon is preferably (but not necessarily) biogenic carbon derived from biomass.

In some embodiments, the halogenated compound and the salt are present in a total amount of about 0.5 wt % to about 15 wt %, or about 1 wt % to about 15 wt %. In various embodiments, the halogenated compound and the salt are present in a total amount of about 0.5 wt %, about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, or about 15 wt %.

In some embodiments, the halogenated compound and/or the salt comprise (e.g., collectively comprise) two or more species selected from the group consisting of magnesium chloride, potassium chloride, sodium chloride, and calcium chloride.

Collectively, the halogenated compound and the salt comprises at least one anion selected from the group consisting of chloride, bromide, iodide, fluoride, sulfate, nitrate, and phosphate. In some embodiments, the halogenated compound and the salt comprise at least two anions selected from the group consisting of chloride, bromide, iodide, fluoride, sulfate, nitrate, and phosphate. For example, in some embodiments the halogenated compound and/or the salt may include ferric chloride sulfate, $FeClSO_4$.

Collectively, the halogenated compound and the salt comprise at least one cation selected from the group consisting of magnesium, potassium, calcium, sodium, ammonium, copper, cobalt, nickel, manganese, iron, zinc, molybdenum, and tungsten. In some embodiments, the halogen compound and the salt comprise at least two cations selected from the group consisting of magnesium, potassium, calcium, sodium, ammonium, copper, cobalt, nickel, manganese, iron, zinc, molybdenum, and tungsten.

In some embodiments, the halogen compound and the salt comprise, consist essentially of, or consist of a naturally occurring salt mixture, or is derived from a naturally occurring salt mixture. A naturally occurring salt mixture may be obtained from ocean water, salt lake water, rock salt, salt brine wells, or combinations thereof, for example. Naturally occurring salt mixtures typically contain various minerals, in addition to salts. The present inventors have found that, unexpectedly, inclusion of naturally occurring salt mixtures improves the performance and stability of the activated carbon, especially after the activated carbon has been used, for example, to adsorb a contaminant (e.g., Hg).

In some embodiments, the naturally occurring salt mixture comprises, consists essentially of, or consists of Dead Sea salt (e.g., salt that is obtained from the Dead Sea in the Jordan Rift Valley). The exact composition of the Dead Sea water varies mainly with season, depth, and temperature, but predominantly includes magnesium chloride, potassium chloride, and high amounts of bromide salts. Because the salt concentration is so high (typically more than 30 wt %, compared to only about 3.5% in sea water), Dead Sea water may be utilized without substantial refinement as the source of the halogenated compound and/or the salt in activated carbon compositions and processes disclosed herein. In other embodiments, the salts will first be concentrated by evaporation or other means for separating water from the salts.

In some embodiments, the naturally occurring salt mixture comprises, consists essentially of, or consists of Great Salt Lake (e.g., salt that is obtained from the Great Salt Lake in Utah). The Great Salt Lake is the largest salt water lake in the Western Hemisphere. It has very high salinity (about 5 wt % to 27 wt %), far saltier than sea water, and its mineral content is constantly increasing. The ionic composition is similar to seawater, much more so than the Dead Sea's water. Compared to the ocean, Great Salt Lake water is slightly enriched in potassium and depleted in calcium. Because the salt concentration is so high, Great Salt Lake water may be utilized directly without substantial refinement as the source of the halogenated compound and/or the salt in activated carbon compositions and processes disclosed herein. In other embodiments, the salts will first be concentrated by evaporation or other means for separating water from the salts.

In some embodiments, the halogenated compound and/or the salt comprises, consists essentially of, or consists of a mixture obtained from another endorheic water body, such as the Aral Sea, the Caspian Sea, Lake Vanda in Antarctica, Lake Assal (Djibouti, Africa), and/or a hypersaline pond and/or lake of the McMurdo Dry Valleys in Antarctica.

In certain embodiments, the naturally occurring salt mixture comprises, consists essentially of, or consists of Dead Sea salt and Great Salt Lake salt. In certain embodiments, the naturally occurring salt mixture comprises, consists essentially of, or consists of Dead Sea salt and sea salt derived from ocean water. In certain embodiments, the naturally occurring salt mixture comprises, consists essentially of, or consists of Great Salt Lake salt and sea salt derived from ocean water.

Other naturally occurring salt mixtures are obtained from underground formations (e.g., rock salt) or salt brine wells that are underground. Such sources of naturally occurring salt mixtures may be used directly, or combined with one or more other sources such as those described above.

In some embodiments, the halogenated compound and/or the salt includes about 10 wt % to about 90 wt % magnesium chloride, such as about 25 wt % to about 40 wt % magnesium chloride. In some embodiments, the halogenated compound and/or the salt includes about 5 wt % to about 75 wt % potassium chloride, such as about 15 wt % to about 35 wt % potassium chloride. In these or other embodiments, the halogenated compound and/or the salt includes about 1 wt % to about 25 wt % sodium chloride, such as about 2 wt % to about 10 wt % sodium chloride.

In some embodiments, the halogenated compound and/or the salt includes each of magnesium chloride ($MgCl_2$), potassium chloride (KCl), and sodium chloride (NaCl), in some embodiments, wherein the weight ratio of ($MgCl_2$+KCl)/NaCl is at least about 2, at least about 3, at least about 4, at least about 5, at least about 6, at least about 7, at least about 8, at least about 9, at least about 10, at least about 11, at least about 12, at least about 13, at least about 14, or at least about 15.

In some embodiments, the halogenated compound and/or the salt includes about 0.1 wt % to about 5 wt % bromide ions (BO, such as about 0.2 wt % to about 2 wt % bromide ions. The halogenated compound and/or the salt may include, for example, about 0.2 wt %, about 0.4 wt %, about 0.7 wt %, about 1 wt %, about 1.2 wt %, about 1.5 wt %, about 1.8 wt %, or more than about 1.8 wt % bromide ions.

In some embodiments, the halogenated compound and/or the salt includes about 0.01 wt % to about 1 wt % sulfate ions ($SO_4^{2-}$), such as about 0.01 wt % to about 0.5 wt % sulfate ions. The halogenated compound and/or the salt may include, for example, about 0.02 wt %, about 0.05 wt %, about 0.1 wt %, about 0.15 wt %, about 0.2 wt %, or about 0.3 wt % sulfate ions.

In some embodiments, the present disclosure provides a biogenic activated carbon composition comprising, on a dry basis:
 80 wt % or more total carbon;
 10 wt % or less hydrogen; and
 about 0.1 wt % to about 10 wt % of at least one anion selected from the group consisting of chloride, bromide, iodide, fluoride, sulfate, nitrate, phosphate, and combinations thereof.

In some embodiments, the composition comprises, on a dry basis, about 0.5 wt % to about 10 wt % of the at least one anion, such as about 2 wt % to about 8 wt % of the at least one anion, or about 1 wt %, about 2 wt %, about 3 wt %, about 4 wt %, about 5 wt %, about 6 wt %, about 7 wt %, about 8 wt %, about 9 wt %, or about 10 wt % of the anion.

In some embodiments, the present disclosure provides a biogenic activated carbon composition comprising, on a dry basis:
 80 wt % or more total carbon;
 10 wt % or less hydrogen; and
 about 0.1 wt % to about 10 wt % of at least one cation selected from the group consisting of magnesium, potassium, calcium, sodium, ammonium, copper, cobalt, nickel, manganese, iron, zinc, molybdenum, tungsten, and combinations thereof.

In some embodiments, the composition comprises, on a dry basis, about 0.5 wt % to about 10 wt % of the at least one cation, such as about 2 wt % to about 8 wt % of the cation or cation mixture, or about 1 wt %, about 2 wt %, about 3 wt %, about 4 wt %, about 5 wt %, about 6 wt %, about 7 wt %, about 8 wt %, about 9 wt %, or about 10 wt % of the cation or cation mixture.

In some embodiments, the present disclosure provides a biogenic activated carbon composition comprising, on a dry basis:
 80 wt % or more total carbon;
 10 wt % or less hydrogen;
 a halogenated compound comprising a salt selected from the group consisting of magnesium chloride, potassium chloride, sodium chloride, calcium chloride, and combinations thereof; and
 a salt,
 wherein the halogenated compound and the salt are present in a total amount of about 0.2 wt % to about 20 wt %.

In some embodiments, the halogenated compound and the salt are present in a total amount, on a dry basis, of about 1 wt % to about 15 wt %, such as about 2 wt % to about 10 wt %, or about 1 wt %, about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, or about 15 wt %.

The halogenated compound and/or the salt includes, in some embodiments, about 10 wt % to about 90 wt % magnesium chloride, such as about 25 wt % to about 40 wt % magnesium chloride. The halogenated compound and/or the salt includes, in some embodiments, about 5 wt % to about 75 wt % potassium chloride, such as about 15 wt % to about 35 wt % potassium chloride. The halogenated compound and/or the salt includes, in some embodiments, about 1 wt % to about 25 wt % sodium chloride, such as about 2 wt % to about 10 wt % sodium chloride. In some embodiments, the halogen compound includes magnesium chloride ($MgCl_2$), potassium chloride (KCl), and sodium chloride (NaCl), and wherein the weight ratio of ($MgCl_2$+ KCl)/NaCl is at least 2, at least 3, at least 4, at least 5, at least 6, at least 7, at least 8, at least 9, or at least 10.

In some embodiments, the halogenated compound and/or the salt includes about 0.1 wt % to about 5 wt % bromide ions, such as about 0.2 wt % to about 2 wt % bromide ions. In some embodiments, the halogenated compound and/or the salt includes about 0.01 wt % to about 1 wt % sulfate ions, such as about 0.01 wt % to about 0.5 wt % sulfate ions.

The halogenated compound and/or the salt may comprise, consist essentially of, or consist of a naturally occurring salt mixture, such as (but not limited to) a salt mixture or a derivative thereof obtained from ocean water, salt lake water, rock salt, salt brine wells, or combinations thereof. In some embodiments, the naturally occurring salt mixture comprises, consists essentially of, or consists of Dead Sea salt. In other embodiments, the naturally occurring salt mixture comprises, consists essentially of, or consists of Dead Sea salt and Great Salt Lake salt or Dead Sea salt and sea salt derived from ocean water.

The present disclosure provides an activated carbon product comprising activated carbon (which may comprise, consist essentially of, or consist of biogenic activated carbon) and Dead Sea salt. The present disclosure also provides an activated carbon product consisting essentially of activated carbon (which may comprise, consist essentially of, or consist of biogenic activated carbon) and Dead Sea salt. In some embodiments, an activated carbon product comprises, consists essentially of, or consists of activated carbon, Dead Sea salt, and Great Salt Lake salt.

In some embodiments, the present disclosure provides a process for producing a halogenated activated carbon composition, the process comprising:

(a) providing a carbon-containing feedstock;

(b) converting the feedstock to an activated carbon intermediate;

(c) combining the activated carbon intermediate, during step (b) or following step (b), with at least two halogens or salts thereof, to form a mixture; and (d) recovering a halogenated activated carbon composition from the mixture, wherein the halogenated activated carbon composition comprises, on a dry basis, at least 85 wt % carbon and about 0.1 wt % to about 15 wt % of the at least two halogens or salts thereof.

The at least two halogens or salts thereof may be introduced at any point in the process. The at least two halogens or salts thereof may be introduced in solid form, dissolved or suspended in liquid solution, in a vapor or mist, or any combinations of the foregoing. In some embodiments, the at least two halogens or salts thereof are introduced as an aqueous solution, followed by evaporating water to generate a dried form of the mixture.

During step (c), a chemical reaction or physical reaction may occur between the activated carbon intermediate and one or more of the at least two halogens or salts thereof. For example, metal carbides may form between metal cations and carbon, or anions may react with hydrogen present in the activated carbon. Salts, cations, or anions may also be physically adsorbed, absorbed, or intercalated within the carbon.

In some embodiments, the process of step (b) comprises the substeps of:

(i) in one or more indirectly heated reaction zones, mechanically countercurrently contacting the feedstock with a vapor stream comprising a substantially inert gas and an activation agent comprising at least one of water or carbon dioxide, to generate solids, condensable vapors, and non-condensable gases, wherein the condensable vapors and the non-condensable gases enter the vapor stream;

(ii) removing at least a portion of the vapor stream from the reaction zone(s), to generate a separated vapor stream;

(iii) recycling at least a portion of the separated vapor stream, or a thermally treated form thereof, to substep (i); and (iv) recovering at least a portion of the solids from the reaction zone(s) as the activated carbon intermediate.

During substep (iii), at least a portion of the separated vapor stream may be thermally oxidized, generating oxidation heat that is then utilized, at least in part, to dry the activated carbon intermediate.

Some embodiments of the present disclosure provide a process for producing a halogenated activated carbon composition, the process comprising:

(a) providing a carbon-containing feedstock;

(b) combining the feedstock with a at least two halogens or salts thereof;

(c) converting the feedstock, combined with the at least two halogens or salts thereof, to a halogenated activated carbon composition; and (d) recovering the halogenated activated carbon composition, wherein the halogenated activated carbon composition comprises, on a dry basis, at least 85 wt % carbon and about 0.1 wt % to about 15 wt % of the at least two halogens or salts thereof.

The at least two halogens or salts thereof may be introduced in solid form, dissolved or suspended in liquid solution, in a vapor or mist, or any combinations of the foregoing, at one or more points in the process. In some embodiments, during step (c), a chemical reaction or physical reaction occurs between the feedstock and one or more of the at least two halogens or salts thereof.

In some embodiments, the process of step (c) may further include the substeps of:

(i) in one or more indirectly heated reaction zones, mechanically countercurrently contacting the feedstock with a vapor stream comprising a substantially inert gas and an activation agent comprising at least one of water or carbon dioxide, to generate solids, condensable vapors, and non-condensable gases, wherein the condensable vapors and the non-condensable gases enter the vapor stream;

(ii) removing at least a portion of the vapor stream from the reaction zone(s), to generate a separated vapor stream;

(iii) recycling at least a portion of the separated vapor stream, or a thermally treated form thereof, to substep (i); and (iv) recovering at least a portion of the solids from the reaction zone(s) as the halogenated activated carbon composition.

During substep (iii), at least a portion of the separated vapor stream may be thermally oxidized, generating oxidation heat that is then utilized, at least in part, dry the halogenated activated carbon composition.

Any of these processes may be a continuous, semi-continuous, or batch.

The carbon-containing feedstock preferably includes biomass, such as biomass is selected from the group consisting of softwood chips, hardwood chips, timber harvesting residues, tree branches, tree stumps, leaves, bark, sawdust, corn, corn stover, wheat, wheat straw, rice, rice straw, sugarcane, sugarcane bagasse, sugarcane straw, energy cane, sugar beets, sugar beet pulp, sunflowers, sorghum, canola, algae, *miscanthus*, alfalfa, switchgrass, fruits, fruit shells, fruit stalks, fruit peels, fruit pits, vegetables, vegetable shells, vegetable stalks, vegetable peels, vegetable pits, grape pumice, almond shells, pecan shells, coconut shells, coffee grounds, food waste, commercial waste, grass pellets, hay pellets, wood pellets, cardboard, paper, paper pulp, paper packaging, paper trimmings, food packaging, lignin, animal manure, municipal solid waste, municipal sewage, and combinations thereof.

In some embodiments, the feedstock comprises biomass, coal, or a mixture of biomass and coal. "Biomass," for purposes of this disclosure, shall be construed as any biogenic feedstock or mixture of a biogenic and non-biogenic feedstock. Elementally, biomass includes at least carbon, hydrogen, and oxygen. The methods and apparatus of the disclosure can accommodate a wide range of feedstocks of various types, sizes, and moisture contents.

Various embodiments of the present disclosure are also useful for carbon-containing feedstocks other than biomass, such as a fossil fuel (e.g., coal or petroleum coke), or any mixtures of biomass and fossil fuels (such as biomass/coal mixtures). In some embodiments, a biogenic feedstock is, or includes, coal, oil shale, crude oil, asphalt, or solids from crude-oil processing (such as petcoke). Feedstocks may include waste tires, recycled plastics, recycled paper, and other waste or recycled materials. Any method, apparatus, or system described herein may be used with any carbonaceous feedstock. Carbon-containing feedstocks may be transportable by any known means, such as by truck, train, ship, barge, tractor trailer, or any other vehicle or means of conveyance.

Typically, regardless of the feedstocks chosen, there can be (in some embodiments) screening to remove undesirable materials. The feedstock may optionally be dried prior to processing. The feedstock may be a wet feedstock.

The feedstock employed may be provided or processed into a wide variety of particle sizes or shapes. For example, the feed material may be a fine powder, or a mixture of fine and coarse particles. The feed material may be in the form of large pieces of material, such as wood chips or other forms of wood (e.g., round, cylindrical, square, etc.). In some embodiments, the feed material comprises pellets or other agglomerated forms of particles that have been pressed together or otherwise bound, such as with a binder.

In some embodiments, the halogenated compounds and/or the salts of the halogenated activated carbon compositions and processes disclosed herein comprise, consist essentially of, or consist of a naturally occurring salt mixture, such as (but not limited to) naturally occurring salt mixtures derived from a source selected from the group consisting of ocean water, salt lake water, rock salt, salt brine wells, and combinations thereof.

In these or other embodiments, the halogenated compound and/or the salt may include a recycled salt obtained after use of the halogenated activated carbon composition (such as following combustion of spent activated carbon). Other sources of halogenated compounds and/or salts may be used, such as crude halogenated compounds or compositions obtained from industrial processes (e.g., salt-containing wastes or byproducts).

The present disclosure provides activated carbon products produced by any of the disclosed processes, and apparatus configured to carry out any of the disclosed processes. The present disclosure also provides methods of using the activated carbon compositions or products for one or more applications selected from the group consisting of emissions control, mercury removal, water purification, groundwater treatment, wastewater treatment, removal of odor-producing or taste-producing compounds from a liquid, energy storage, energy transfer, capacitance, ion storage, and ion transfer.

Reactor systems configured to pyrolyze and activate carbon-containing feedstocks, and introduce halogenated compound(s) and/or salts, will now be described in further detail.

In some embodiments, the reactor system is configured to carry out a continuous process for producing activated carbon (e.g., a halogenated activated carbon composition as disclosed herein). In such embodiments, the reactor system comprises:

(a) an optional dryer for drying the one or more co-products by removing at least a portion of moisture from the one or more co-products;

(b) one or more indirectly heated reaction zones for mechanically countercurrently contacting the one or more co-products with a vapor stream comprising a substantially inert gas and an activation agent comprising at least one of water or carbon dioxide, to generate solids, condensable vapors, and non-condensable gases, wherein the condensable vapors and the non-condensable gases enter the vapor stream, wherein the one or more indirectly heated reaction zones includes an optional gas inlet;

(c) a vapor stream separator in operative communication with one or more indirectly heated reaction zone for removing at least a portion of the vapor stream from the reaction zone to generate a separated vapor stream and for recycling at least a portion of the separated vapor stream, or a thermally treated form thereof, to contact the one or more co-products prior to step (b) and/or to convey to the gas inlet of the reaction zone(s); and (d) an activated carbon recovery zone for recovering at least a portion of the solids from the reaction zone(s) as activated carbon.

It is noted that size reduction is a costly and energy-intensive process. Pyrolyzed material can be sized with significantly less energy input, i.e. it can be more energy efficient to reduce the particle size of the product instead of (or in addition to) the feedstock. This is an option in the present disclosure because the process does not require a fine starting material, and there is not necessarily any particle-size reduction during processing. The present disclosure provides the ability to process very large pieces of feedstock. Notably, some market applications of the activated carbon product actually require large sizes (e.g., on the order of centimeters), so that in some embodiments, large pieces are fed, produced, and sold. It should be appreciated that, while not necessary in all embodiments of this disclosure, smaller sizing has resulted in higher fixed carbon numbers under similar process conditions and may be utilized in some applications that typically call for small sized activated carbon products and/or higher fixed carbon content.

When it is desired to produce a final carbonaceous biogenic activated carbon product that has structural integrity, such as in the form of cylinders, there are at least two options in the context of this disclosure. First, the material produced from the process is collected and then further process mechanically into the desired form. For example, the product is pressed or pelletized, with a binder. The second option is to utilize feed materials that generally possess the desired size and/or shape for the final product, and employ processing steps that do not destroy the basic structure of the feed material. In some embodiments, the feed and product have similar geometrical shapes, such as spheres, cylinders, or cubes.

The ability to maintain the approximate shape of feed material throughout the process is beneficial when product strength is important. Also, this control avoids the difficulty and cost of pelletizing high fixed-carbon materials.

There are a large number of options as to intermediate input and output (purge or probe) streams of one or more phases present in any particular reactor, various mass and energy recycle schemes, various additives that may be introduced anywhere in the process, adjustability of process conditions including both reaction and separation conditions in order to tailor product distributions, and so on. Zone or reactor-specific input and output streams enable good process monitoring and control, such as through FTIR sampling and dynamic process adjustments.

As used herein, the term "zones" includes regions of space within a single physical unit, physically separate units, or any combination thereof. The demarcation of zones may relate to structure, such as the presence of flights or distinct heating elements to provide heat to separate zones. Alternatively, or additionally, in various embodiments, the demarcation of zones relates to function, such as at least: distinct temperatures, fluid flow patterns, solid flow patterns, and extent of reaction. In a single batch reactor, "zones" are operating regimes in time, rather than in space. It will be appreciated that there are not necessarily abrupt transitions from one zone to another zone.

All references to zone temperatures in this specification include temperatures that may apply to the bulk solids present, or the gas phase, or the reactor walls (on the process side). It will be understood that there may be a temperature gradient in each zone, both axially and radially, as well as temporally (i.e., following start-up or due to transients). Thus, references to zone temperatures may be references to average temperatures or other effective temperatures that may influence the actual kinetics. Temperatures may be directly measured by thermocouples or other temperature probes, or indirectly measured or estimated by other means.

Various flow patterns may be desired or observed. With chemical reactions and simultaneous separations involving multiple phases in multiple zones, the fluid dynamics can be quite complex. Typically, the flow of solids may approach plug flow (well-mixed in the radial dimension) while the flow of vapor may approach fully mixed flow (fast transport in both radial and axial dimensions). Multiple inlet and outlet ports for vapor may contribute to overall mixing.

An optional step of separating at least a portion of the condensable vapors and at least a portion of the non-condensable gases from the hot pyrolyzed solids may be accomplished in the reactor itself, or using a distinct separation unit. A substantially inert sweep gas may be introduced into one or more of the zones. Condensable vapors and non-condensable gases are then carried away from the zone(s) in the sweep gas.

The sweep gas may be $N_2$, Ar, CO, $CO_2$, $H_2$, $H_2O$, $CH_4$, other light hydrocarbons, or combinations thereof, for example. The sweep gas may first be preheated prior to introduction, or cooled if it is obtained from a heated source, to provide the sweep gas at a desired temperature.

The sweep gas more thoroughly removes volatile components, by enabling removal from the system before they can condense or further react. The sweep gas allows volatiles to be removed at higher rates than would be attained merely from volatilization at a given process temperature. Or, use of the sweep gas allows milder temperatures to be used to remove a certain quantity of volatiles. The reason the sweep gas improves the volatiles removal is that the mechanism of separation is not merely relative volatility but rather liquid/vapor phase disengagement assisted by the sweep gas. The sweep gas can both reduce mass-transfer limitations of volatilization as well as reduce thermodynamic limitations by continuously depleting a given volatile species, to cause more of it to vaporize to attain thermodynamic equilibrium.

It is important to remove gases laden with volatile organic carbon from subsequent processing stages, in order to produce a product with high fixed carbon. Without removal, the volatile carbon can adsorb or absorb onto the pyrolyzed solids, thereby requiring additional energy (cost) to achieve a purer form of carbon which may be desired. By removing vapors quickly, it is also speculated that porosity may be enhanced in the pyrolyzing solids.

In certain embodiments, the sweep gas in conjunction with a relatively low process pressure, such as atmospheric pressure, provides for fast vapor removal without large amounts of inert gas necessary.

In some embodiments, the sweep gas flows countercurrent to the flow direction of feedstock. In other embodiments, the sweep gas flows cocurrent to the flow direction of feedstock. In some embodiments, the flow pattern of solids approaches plug flow while the flow pattern of the sweep gas, and gas phase generally, approaches fully mixed flow in one or more zones.

The sweep may be performed in any one or more of the zones. In some embodiments, the sweep gas is introduced into the cooling zone and extracted (along with volatiles produced) from the cooling and/or pyrolysis zones. In some embodiments, the sweep gas is introduced into the pyrolysis zone and extracted from the pyrolysis and/or preheating zones. In some embodiments, the sweep gas is introduced into the preheating zone and extracted from the pyrolysis zone. In these or other embodiments, the sweep gas may be introduced into each of the preheating, pyrolysis, and cooling zones and also extracted from each of the zones.

The sweep gas may be introduced continuously, especially when the solids flow is continuous. When the pyrolysis reaction is operated as a batch process, the sweep gas may be introduced after a certain amount of time, or periodically, to remove volatiles. Even when the pyrolysis reaction is operated continuously, the sweep gas may be introduced semi-continuously or periodically, if desired, with suitable valves and controls.

The volatiles-containing sweep gas may exit from the one or more zones, and may be combined if obtained from multiple zones. The resulting gas stream, containing various vapors, may then be fed to a process gas heater for control of air emissions. Any known thermal-oxidation unit may be employed. In some embodiments, the process gas heater is fed with natural gas and air, to reach sufficient temperatures for substantial destruction of volatiles contained therein.

The effluent of the process gas heater will be a hot gas stream comprising water, carbon dioxide, and nitrogen. This effluent stream may be purged directly to air emissions, if desired. In some embodiments, the energy content of the process gas heater effluent is recovered, such as in a waste-heat recovery unit. The energy content may also be recovered by heat exchange with another stream (such as the sweep gas). The energy content may be utilized by directly or indirectly heating, or assisting with heating, a unit elsewhere in the process, such as the dryer or the reactor. In some embodiments, essentially all of the process gas heater effluent is employed for indirect heating (utility side) of the dryer. The process gas heater may employ other fuels than natural gas.

Carbonaceous solids may be introduced into a cooler. In some embodiments, solids are collected and simply allowed to cool at slow rates. If the carbonaceous solids are reactive or unstable in air, it may be desirable to maintain an inert atmosphere and/or rapidly cool the solids to, for example, a temperature less than 40° C., such as ambient temperature. In some embodiments, a water quench is employed for rapid cooling. In some embodiments, a fluidized-bed cooler is employed. A "cooler" should be broadly construed to also include containers, tanks, pipes, or portions thereof.

In some embodiments, the process further comprises operating the cooler to cool the warm pyrolyzed solids with steam, thereby generating the cool pyrolyzed solids and superheated steam; wherein the drying is carried out, at least in part, with the superheated steam derived from the cooler. Optionally, the cooler may be operated to first cool the warm pyrolyzed solids with steam to reach a first cooler temperature, and then with air to reach a second cooler temperature, wherein the second cooler temperature is lower than the first cooler temperature and is associated with a reduced combustion risk for the warm pyrolyzed solids in the presence of the air.

Following cooling to ambient conditions, the carbonaceous solids may be recovered and stored, conveyed to another site operation, transported to another site, or otherwise disposed, traded, or sold. The solids may be fed to a unit to reduce particle size. A variety of size-reduction units are known in the art, including crushers, shredders, grinders, pulverizers, jet mills, pin mills, and ball mills.

Screening or some other means for separation based on particle size may be included. The screening may be upstream or downstream of grinding, if present. A portion of the screened material (e.g., large chunks) may be returned to the grinding unit. The small and large particles may be recovered for separate downstream uses. In some embodiments, cooled pyrolyzed solids are ground into a fine powder, such as a pulverized carbon or activated carbon product or increased strength.

Various additives may be introduced throughout the process, before, during, or after any step disclosed herein. The additives may be broadly classified as process additives, selected to improve process performance such as carbon yield or pyrolysis time/temperature to achieve the desired carbon purity; and product additives, selected to improve one or more properties of the biogenic activated carbon, or a downstream product incorporating the reagent. Certain additives may provide enhanced process and product characteristics, such as overall yield of biogenic activated carbon product compared to the amount of biomass feedstock. In some embodiments, additives as discussed below refer to halogenated compounds and/or salts. In these or other embodiments, additives are incorporated into the halogenated activated carbon in addition to the halogenated compounds and/or salts.

The additive may be added at any suitable time during the entire process. For example and without limitation, the additive may be added before, during or after a feedstock drying step; before, during or after a feedstock deaerating step; before, during or after a combustion step; before, during or after a pyrolysis step; before, during or after a separation step; before, during or after any cooling step; before, during or after a biogenic activated carbon recovery step; before, during or after a pulverizing step; before, during or after a sizing step; and/or before, during or after a packaging step. Additives may be incorporated at or on feedstock supply facilities, transport trucks, unloading equipment, storage bins, conveyors (including open or closed conveyors), dryers, process heaters, or any other units. Additives may be added anywhere into the pyrolysis process itself, using suitable means for introducing additives. Additives may be added after carbonization, or even after pulverization, if desired.

In some embodiments, an additive is selected from a metal, a metal oxide, a metal hydroxide, or a combination thereof. For example an additive may be selected from, but is by no means limited to, magnesium, manganese, aluminum, nickel, chromium, silicon, boron, cerium, molybdenum, phosphorus, tungsten, vanadium, iron halide, iron chloride, iron bromide, magnesium oxide, dolomite, dolomitic lime, fluorite, fluorospar, bentonite, calcium oxide, lime, and combinations thereof.

In some embodiments, an additive is selected from an acid, a base, or a salt thereof. For example an additive may be selected from, but is by no means limited to, sodium hydroxide, potassium hydroxide, magnesium oxide, hydrogen bromide, hydrogen chloride, sodium silicate, potassium permanganate, organic acids (e.g., citric acid), or combinations thereof.

In some embodiments, an additive is selected from a metal halide. Metal halides are compounds between metals and halogens (fluorine, chlorine, bromine, iodine, and astatine). The halogens can form many compounds with metals. Metal halides are generally obtained by direct combination, or more commonly, neutralization of basic metal salt with a hydrohalic acid. In some embodiments, an additive is selected from iron halide ($FeX_2$ and/or $FeX_3$), iron chloride ($FeCl_2$ and/or $FeCl_3$), iron bromide ($FeBr_2$ and/or $FeBr_3$), or hydrates thereof, and any combinations thereof.

In some embodiments, an additive is selected from alkali metals or alkali metal-containing compounds such as those containing lithium, sodium, potassium, rubidium, caesium or francium. In some of these embodiments, the carbon/metal compound can stores or transfer energy.

In some embodiments, a biogenic activated carbon composition comprises, on a dry basis:

55 wt % or more total carbon;
15 wt % or less hydrogen;
1 wt % or less nitrogen;
0.5 wt % or less phosphorus;
0.2 wt % or less sulfur;
an additive selected from an acid, a base, a salt, a metal, a metal oxide, a metal hydroxide, a metal halide, iodine, an iodine compound, or a combination thereof.

In some embodiments, the additive comprises iodine or an iodine compound, or a combination of iodine and one or more iodine compounds. When the additive comprises iodine, it may be present in the biogenic activated carbon composition as absorbed or intercalated molecular $I_2$, as physically or chemically adsorbed molecular $I_2$, as absorbed or intercalated atomic I, as physically or chemically adsorbed atomic I, or any combination thereof.

When the additive comprises one or more iodine compounds, they may be selected from the group consisting of iodide ion, hydrogen iodide, an iodide salt, a metal iodide, ammonium iodide, an iodine oxide, triiodide ion, a triiodide salt, a metal triiodide, ammonium triiodide, iodate ion, an iodate salt, a polyiodide, iodoform, iodic acid, methyl iodide, an iodinated hydrocarbon, periodic acid, orthoperiodic acid, metaperiodic acid, and combinations, salts, acids, bases, or derivatives thereof.

In some embodiments, the additive comprises iodine or an iodine compound, or a combination of iodine and one or more iodine compounds, optionally dissolved in a solvent. Various solvents for iodine or iodine compounds are known in the art. For example, alkyl halides such as (but not limited to) n-propyl bromide or n-butyl iodide may be employed. Alcohols such as methanol or ethanol may be used. In some embodiments, a tincture of iodine may be employed to introduce the additive into the composition.

In some embodiments, the additive comprises iodine that is introduced as a solid that sublimes to iodine vapor for incorporation into the biogenic activated carbon composition. At room temperature, iodine is a solid. Upon heating, the iodine sublimes into a vapor. Thus, solid iodine particles may be introduced into any stream, vessel, pipe, or container (e.g. a barrel or a bag) that also includes the biogenic activated carbon composition. Upon heating the iodine particles will sublime, and the $I_2$ vapor can penetrate into the carbon particles, thus incorporating iodine as an additive on the surface of the particles and potentially within the particles.

In one embodiment, the present disclosure provides a method of using a halogenated activated carbon composition to reduce emissions, the method comprising:

(a) providing activated-carbon particles comprising a halogenated activated carbon composition;

(b) providing a gas-phase emissions stream comprising at least one selected contaminant;

(c) introducing the halogenated activated-carbon particles into the gas-phase emissions stream, to adsorb at least a portion of the selected contaminant onto the halogenated activated-carbon particles, thereby generating contaminant-adsorbed halogenated activated carbon particles within the gas-phase emissions stream; and (d) separating at least a portion of the contaminant-adsorbed halogenated activated carbon particles from the gas-phase emissions stream, to produce a contaminant-reduced gas-phase emissions stream.

The halogenated activated carbon composition may be any halogenated activated carbon composition described herein including, for example, a halogenated activated carbon composition comprising, on a dry basis, at least 85 wt % carbon; a halogenated compound; and a salt, wherein the halogenated compound and the salt are present in a total amount of about 0.1 wt % to about 15 wt %. The additive may be provided as part of the activated-carbon particles. Alternatively, or additionally, the additive may be introduced directly into the gas-phase emissions stream.

The additive may be selected from an acid, a base, a salt, a metal, a metal oxide, a metal hydroxide, a metal halide, iodine, an iodine compound, or a combination thereof. In some embodiments, the additive comprises iodine or an iodine compound, or a combination of iodine and one or more iodine compounds, optionally dissolved in a solvent.

In some embodiments, the selected contaminant is a metal, such as a metal selected from the group consisting of mercury, boron, selenium, arsenic, and any compound, salt, and mixture thereof. In some embodiments, the selected contaminant is a hazardous air pollutant or a volatile organic compound. In some embodiments, the selected contaminant is a non-condensable gas selected from the group consisting of nitrogen oxides, carbon monoxide, carbon dioxide, hydrogen sulfide, sulfur dioxide, sulfur trioxide, methane, ethane, ethylene, ozone, ammonia, and combinations thereof.

In some embodiments, the contaminant-adsorbed halogenated activated carbon particles include, in absorbed, adsorbed, or reacted form, at least one, two, three, or all contaminants selected from the group consisting of carbon dioxide, nitrogen oxides, mercury, and sulfur dioxide.

In some embodiments, the gas-phase emissions stream is derived from combustion of a fuel comprising the halogenated activated carbon composition. In certain embodiments, the gas-phase emissions stream is derived from co-combustion of coal and the halogenated activated carbon composition.

In some embodiments, the separating in step (d) comprises filtration, which may for example utilize fabric filters. In some embodiments, separating in step (d) comprises electrostatic precipitation. Scrubbing (including wet or dry scrubbing) may also be employed. Optionally, the contaminant-adsorbed carbon particles may be treated to regenerate the activated-carbon particles. In some embodiments, the contaminant-adsorbed carbon particles are thermally oxidized catalytically or non-catalytically. The contaminant-adsorbed carbon particles, or a regenerated form thereof, may be combusted to provide energy and/or gasified to provide syngas.

In some embodiments, the present disclosure provides a method of using a halogenated biogenic activated carbon composition to reduce mercury emissions, the method comprising:

(a) providing halogenated activated-carbon particles comprising a halogenated biogenic activated carbon composition;

(b) providing a gas-phase emissions stream comprising mercury;

(c) introducing the halogenated activated-carbon particles into the gas-phase emissions stream, to adsorb at least a portion of the mercury onto the halogenated activated-carbon particles, thereby generating mercury-adsorbed halogenated carbon particles within the gas-phase emissions stream; and (d) separating at least a portion of the mercury-adsorbed halogenated carbon particles from the gas-phase emissions stream using electrostatic precipitation, to produce a mercury-reduced gas-phase emissions stream.

In one embodiment, the present disclosure provides a process for energy production, the process comprising:

(a) providing a carbon-containing feedstock comprising a halogenated biogenic activated carbon composition; and (b) oxidizing the carbon-containing feedstock to generate energy and a gas-phase emissions stream, wherein the presence of the halogenated biogenic activated carbon composition within the carbon-containing feedstock is effective to adsorb at least one contaminant produced as a byproduct of the oxidizing or derived from the carbon-containing feedstock, thereby reducing emissions of the contaminant, and wherein the halogenated biogenic activated carbon composition comprises, on a dry basis, at least 85 wt % carbon;

a halogenated compound; and a salt, wherein the halogenated compound and the salt are present in a total amount of about 0.1 wt % to about 15 wt %.

In some embodiments, the contaminant, or a precursor thereof, is contained within the carbon-containing feedstock. In some embodiments, the contaminant is produced as a byproduct of the oxidizing. The carbon-containing feedstock further comprises biomass, coal, or another carbonaceous feedstock, in various embodiments.

The selected contaminant may be a metal selected from the group consisting of mercury, boron, selenium, arsenic, and any compound, salt, and mixture thereof; a hazardous air pollutant; a volatile organic compound; or a non-condensable gas selected from the group consisting of nitrogen oxides, carbon monoxide, carbon dioxide, hydrogen sulfide, sulfur dioxide, sulfur trioxide, methane, ethane, ethylene, ozone, ammonia; and combinations thereof.

In some embodiments, the present disclosure provides a method of using a halogenated biogenic activated carbon composition to purify a liquid, the method comprising:

(a) providing halogenated activated-carbon particles comprising a biogenic activated carbon composition;

(b) providing a liquid comprising at least one selected contaminant; and (c) contacting the liquid with the halogenated activated-carbon particles to adsorb at least a portion of the at least one selected contaminant onto the halogenated activated-carbon particles, thereby generating contaminant-adsorbed halogenated carbon particles and a contaminant-reduced liquid.

The halogenated biogenic activated carbon may be any halogenated activated carbon composition described herein including, for example, a halogenated biogenic activated carbon composition comprising, on a dry basis, at least 85 wt % carbon; a halogenated compound; and a salt, wherein the halogenated compound and the salt are present in a total amount of about 0.1 wt % to about 15 wt %.

In some embodiments, the halogenated compound and/or the salt comprises iodine as absorbed or intercalated molecular $I_2$, physically or chemically adsorbed molecular $I_2$, absorbed or intercalated atomic I, physically or chemically adsorbed atomic I, or a combination thereof.

In some embodiments, the halogenated compound and/or the salt comprises an iodine-containing compound, such as (but not limited to) an iodine-containing compound is selected from the group consisting of iodide ion, hydrogen iodide, an iodide salt, a metal iodide, ammonium iodide, an iodine oxide, triiodide ion, a triiodide salt, a metal triiodide, ammonium triiodide, iodate ion, an iodate salt, a polyiodide, iodoform, iodic acid, methyl iodide, an iodinated hydrocarbon, periodic acid, orthoperiodic acid, metaperiodic acid, and combinations, salts, acids, bases, or derivatives thereof.

The halogenated compound and/or the salt may be applied to wet or dry biomass feedstocks. The additives may be applied as a solid powder, a spray, a mist, a liquid, or a vapor. In some embodiments, the halogenated compound and/or the salt may be introduced through spraying of a liquid solution (such as an aqueous solution or in a solvent), or by soaking in tanks, bins, bags, or other containers.

In certain embodiments, dip pretreatment is employed wherein the solid feedstock is dipped into a bath comprising the halogenated compound and/or the salt, either batchwise or continuously, for a time sufficient to allow penetration of the halogenated compound and/or the salt into the solid feed material.

In some embodiments, the process for producing a halogenated biogenic activated carbon further comprises a step of sizing (e.g., sorting, screening, classifying, etc.) the warm or cool pyrolyzed solids to form sized pyrolyzed solids. The sized pyrolyzed solids can then be used in applications which call for an activated carbon product having a certain particle size characteristic.

The throughput, or process capacity, may vary widely from small laboratory-scale units to full commercial-scale biorefineries, including any pilot, demonstration, or semi-commercial scale. In various embodiments, the process capacity is at least about 1 kg/day, 10 kg/day, 100 kg/day, 1 ton/day (all tons are metric tons), 10 tons/day, 100 tons/day, 500 tons/day, 1000 tons/day, 2000 tons/day, or higher.

Solid, liquid, and gas streams produced or existing within the process can be independently recycled, passed to subsequent steps, or removed/purged from the process at any point.

Gas outlets (probes) allow precise process monitoring and control across various stages of the process, up to and potentially including all stages of the process. Precise process monitoring would be expected to result in yield and efficiency improvements, both dynamically as well as over a period of time when operational history can be utilized to adjust process conditions.

In some embodiments, a reaction gas probe is disposed in operable communication a process zone. Such a reaction gas probe may be useful to extract gases and analyze them, in order to determine extent of reaction, pyrolysis selectivity, or other process monitoring. Then, based on the measurement, the process may be controlled or adjusted in any number of ways, such as by adjusting feed rate, rate of inert gas sweep, temperature (of one or more zones), pressure (of one or more zones), additives, and so on.

As intended herein, "monitor and control" via reaction gas probes should be construed to include any one or more sample extractions via reaction gas probes, and optionally making process or equipment adjustments based on the measurements, if deemed necessary or desirable, using well-known principles of process control (feedback, feedforward, proportional-integral-derivative logic, etc.).

A reaction gas probe may be configured to extract gas samples in a number of ways. For example, a sampling line may have a lower pressure than the pyrolysis reactor pressure, so that when the sampling line is opened an amount of gas can readily be extracted from pyrolysis zone. The sampling line may be under vacuum, such as when the pyrolysis zone is near atmospheric pressure. Typically, a reaction gas probe will be associated with one gas output, or a portion thereof (e.g., a line split from a gas output line).

In some embodiments, both a gas input and a gas output are utilized as a reaction gas probe by periodically introducing an inert gas into a zone, and pulling the inert gas with a process sample out of the gas output ("sample sweep"). Such an arrangement could be used in a zone that does not otherwise have a gas inlet/outlet for the substantially inert gas for processing, or, the reaction gas probe could be associated with a separate gas inlet/outlet that is in addition to process inlets and outlets. A sampling inert gas that is introduced and extracted periodically for sampling (in embodiments that utilize sample sweeps) could even be different than the process inert gas, if desired, either for reasons of accuracy in analysis or to introduce an analytical tracer.

For example, acetic acid concentration in the gas phase may be measured using a gas probe to extract a sample, which is then analyzed using a suitable technique (such as gas chromatography, GC; mass spectroscopy, MS; GC-MS, or Fourier-Transform Infrared Spectroscopy, FTIR). CO and/or $CO_2$ concentration in the gas phase could be measured and used as an indication of the pyrolysis selectivity toward gases/vapors, for example. Terpene concentration in the gas phase could be measured and used as an indication of the pyrolysis selectivity toward liquids, and so on.

In some embodiments, the system further comprises at least one additional gas probe disposed in operable communication with the cooling zone, or with the drying zone (if present) or the preheating zone (if present).

A gas probe for the cooling zone could be useful to determine the extent of any additional chemistry taking place in the cooling zone, for example. A gas probe in the cooling zone could also be useful as an independent measurement of temperature (in addition, for example, to a thermocouple disposed in the cooling zone). This independent measurement may be a correlation of cooling temperature with a measured amount of a certain species. The correlation could be separately developed, or could be established after some period of process operation.

A gas probe for the drying zone could be useful to determine the extent of drying, by measuring water content, for example. A gas probe in the preheating zone could be useful to determine the extent of any mild pyrolysis taking place, for example.

In some embodiments of the disclosure, the system further includes a process gas heater disposed in operable communication with the outlet at which condensable vapors and non-condensable gases are removed. The process gas heater can be configured to receive a separate fuel (such as natural gas) and an oxidant (such as air) into a combustion chamber, adapted for combustion of the fuel and at least a portion of the condensable vapors. Certain non-condensable gases may also be oxidized, such as CO or $CH_4$, to $CO_2$.

When a process gas heater is employed, the system may include a heat exchanger disposed between the process gas heater and the dryer, configured to utilize at least some of the heat of the combustion for the dryer. This embodiment can contribute significantly to the overall energy efficiency of the process.

In some embodiments, the system further comprises a material enrichment unit, disposed in operable communication with a cooler, configured for combining condensable vapors, in at least partially condensed form, with the solids. The material enrichment unit may increase the carbon content of the halogenated biogenic activated carbon.

In certain embodiments, the combustion products include carbon monoxide, the process further comprising utilizing the carbon monoxide as a fuel within the process or for another process. For example, the CO may be used as a direct or indirect fuel to a pyrolysis unit.

The system may further include a separate pyrolysis zone adapted to further pyrolyze the halogenated biogenic activated carbon to further increase its carbon content. The separate pyrolysis zone may be a relatively simply container, unit, or device, such as a tank, barrel, bin, drum, tote, sack, or roll-off.

The overall system may be at a fixed location, or it may be made portable. The system may be constructed using modules which may be simply duplicated for practical scale-up. The system may also be constructed using economy-of-scale principles, as is well-known in the process industries.

In some embodiments, the process for producing a halogenated biogenic activated carbon further comprises a step of sizing (e.g., sorting, screening, classifying, etc.) the warm or cool pyrolyzed solids to form sized pyrolyzed solids. The sized pyrolyzed solids can then be used in applications which call for a halogenated activated carbon product having a certain particle size characteristic.

In some embodiments, the halogenated biogenic activated carbon comprises at least about 55 wt. % total carbon on a dry basis, for example at least 55 wt. %, at least 60 wt. %, at least 65 wt. %, at least 70 wt %, at least 75 wt. %, at least 80 wt %, at least 85 wt. %, at least 90 wt %, at least 95 wt %, at least 96 wt %, at least 97 wt %, at least 98 wt %, or at least 99 wt % total carbon on a dry basis. The total carbon includes at least fixed carbon, and may further include carbon from volatile matter. In some embodiments, carbon from volatile matter is about at least 5%, at least 10%, at least 25%, or at least 50% of the total carbon present in the biogenic activated carbon. Fixed carbon may be measured using ASTM D3172, while volatile carbon may be estimated using ASTM D3175, for example.

Halogenated biogenic activated carbon according to the present disclosure may comprise about 0 wt % to about 8 wt % hydrogen. In some embodiments, biogenic activated carbon comprises greater than about 0.5 wt % hydrogen, for example about 0.6 wt %, about 0.7 wt %, about 0.8 wt %, about 0.9 wt %, about 1 wt %, about 1.2 wt %, about 1.4 wt %, about 1.6 wt %, about 1.8 wt %, about 2 wt %, about 2.2 wt %, about 2.4 wt %, about 2.6 wt %, about 2.8 wt %, about 3 wt %, about 3.2 wt %, about 3.4 wt %, about 3.6 wt %, about 3.8 wt %, about 4 wt %, or greater than about 4 wt % hydrogen. The hydrogen content of halogenated biogenic activated carbon may be determined by any suitable method known in the art, for example by the combustion analysis procedure outlined in ASTM D5373. In some embodiments, halogenated biogenic activated carbon has a hydrogen content that is greater than the hydrogen content of activated carbon derived from fossil fuel sources. Typically, fossil fuel based activated carbon products have less than 1 wt % hydrogen, for example about 0.6 wt % hydrogen. In some embodiments, the characteristics of a halogenated activated carbon product can be optimized by blending an amount of a fossil fuel based activated carbon product (i.e., with a very low hydrogen content) with a suitable amount of a halogenated biogenic activated carbon product having a hydrogen content greater than that of the fossil fuel based activated carbon product.

The halogenated biogenic activated carbon may comprise about 10 wt % or less, such as about 5 wt % or less, hydrogen on a dry basis. The biogenic activated carbon product may comprise about 1 wt % or less, such as about 0.5 wt % or less, nitrogen on a dry basis. The biogenic activated carbon product may comprise about 0.5 wt % or less, such as about 0.2 wt % or less, phosphorus on a dry basis. The biogenic activated carbon product may comprise about 0.2 wt % or less, such as about 0.1 wt % or less, sulfur on a dry basis.

In certain embodiments, the halogenated biogenic activated carbon includes oxygen, such as up to 20 wt % oxygen, for example about 0.2 wt %, about 0.5 wt %, about 1 wt %, about 2 wt %, about 3 wt %, about 4 wt %, about 5 wt %, about 6 wt %, about 7 wt %, about 7.5 wt %, about 8 wt %, about 9 wt %, about 10 wt %, about 11 wt %, about 12 wt %, about 13 wt %, about 14 wt %, about 15 wt %, about 16 wt %, about 17 wt %, about 18 wt %, about 19 wt %, or about 20 wt % oxygen. The presence of oxygen may be beneficial in the activated carbon for certain applications, such as mercury capture, especially in conjunction with the presence of a halogen (such as chlorine or bromine). In some embodiments, biogenic activated carbon has a oxygen content that is greater than the oxygen content of activated carbon derived from fossil fuel sources. Typically, fossil fuel based activated carbon products have less than 10 wt % oxygen, for example about 7 wt % oxygen or about 0.3 wt % oxygen. In some embodiments, the characteristics of an activated carbon product can be optimized by blending an amount of a fossil fuel based activated carbon product (i.e., with a very low oxygen content) with a suitable amount of a biogenic activated carbon product having an oxygen content greater than that of the fossil fuel based activated carbon product.

Carbon, hydrogen, and nitrogen may be measured using ASTM D5373 for ultimate analysis, for example. Oxygen may be estimated using ASTM D3176, for example. Sulfur may be measured using ASTM D3177, for example.

Certain embodiments provide reagents with little or essentially no hydrogen (except from any moisture that may be present), nitrogen, phosphorus, or sulfur, and are substantially carbon plus any ash and moisture present, plus the halogenated compound and/or the salt. Therefore, some embodiments provide a material with up to and including 100% carbon, on a dry, ash-free, and halogen/salt-free basis.

Various amounts of non-combustible matter, such as ash, may be present in the final product. The halogenated biogenic activated carbon may comprise about 10 wt % or less, such as about 5 wt %, about 2 wt %, about 1 wt % or less than about 1 wt % of non-combustible matter on a dry basis. In certain embodiments, the reagent includes little ash, or even essentially no ash or other non-combustible matter. Therefore, some embodiments provide essentially pure carbon, including 100% carbon, on a dry basis.

Various amounts of moisture may be present. On a total mass basis, the halogenated biogenic activated carbon may comprise at least 1 wt %, at least 2 wt %, at least 5 wt %, at least 10 wt %, at least 15 wt %, at least 25 wt %, at least 35 wt %, at least 50 wt %, or more than 50 wt % of moisture. As intended herein, "moisture" is to be construed as including any form of water present in the biogenic activated carbon product, including absorbed moisture, adsorbed water molecules, chemical hydrates, and physical hydrates. The equilibrium moisture content may vary at least with the local environment, such as the relative humidity. Also, moisture may vary during transportation, preparation for use, and other logistics. Moisture may be measured by any suitable method known in the art, including ASTM D3173, for example.

The halogenated biogenic activated carbon may have various "energy content" which for present purposes means the energy density based on the higher heating value associated with total combustion of the bone-dry reagent. For example, the halogenated biogenic activated carbon may possess an energy content of about at least 11,000 Btu/lb, at least 12,000 Btu/lb, at least 13,000 Btu/lb, at least 14,000 Btu/lb, or at least 15,000 Btu/lb. In certain embodiments, the energy content is between about 14,000-15,000 Btu/lb. The energy content may be measured by any suitable method known in the art, including ASTM D5865, for example.

The halogenated biogenic activated carbon may be formed into a powder, such as a coarse powder or a fine powder. For example, the reagent may be formed into a powder with an average mesh size of about 200 mesh, about 100 mesh, about 50 mesh, about 10 mesh, about 6 mesh, about 4 mesh, or about 2 mesh, in embodiments. In some embodiments, the halogenated biogenic activated carbon has an average particle size of up to about 500 µm, for example less than about 10 µm, about 10 µm, about 25 µm, about 50 µm, about 75 µm, about 100 µm, about 200 µm, about 300 µm, about 400 µm, or about 500 µm.

The halogenated biogenic activated carbon may be produced as powder activated carbon, which generally includes particles with a size predominantly less than 0.21 mm (70 mesh). The halogenated biogenic activated carbon may be produced as granular activated carbon, which generally includes irregularly shaped particles with sizes ranging from 0.2 mm to 5 mm. The halogenated biogenic activated carbon may be produced as pelletized activated carbon, which generally includes extruded and cylindrically shaped objects with diameters from 0.8 mm to 5 mm.

In some embodiments, the halogenated biogenic activated carbon is formed into structural objects comprising pressed, binded, or agglomerated particles. The starting material to form these objects may be a powder form of the reagent, such as an intermediate obtained by particle-size reduction. The objects may be formed by mechanical pressing or other forces, optionally with a binder or other means of agglomerating particles together.

Following formation from pyrolysis, the halogenated biogenic activated carbon may be pulverized to form a powder. "Pulverization" in this context is meant to include any sizing, milling, pulverizing, grinding, crushing, extruding, or other primarily mechanical treatment to reduce the average particle size. The mechanical treatment may be assisted by chemical or electrical forces, if desired. Pulverization may be a batch, continuous, or semi-continuous process and may be carried out at a different location than that of formation of the pyrolyzed solids, in some embodiments.

In some embodiments, the halogenated biogenic activated carbon is produced in the form of structural objects whose structure substantially derives from the feedstock. For example, feedstock chips may produce product chips of halogenated biogenic activated carbon. Or, feedstock cylinders may produce halogenated biogenic activated carbon cylinders, which may be somewhat smaller but otherwise maintain the basic structure and geometry of the starting material.

A halogenated biogenic activated carbon according to the present disclosure may be produced as, or formed into, an object that has a minimum dimension of at least about 1 cm, 2 cm, 3 cm, 4 cm, 5 cm, 6 cm, 7 cm, 8 cm, 9 cm, 10 cm, or higher. In various embodiments, the minimum dimension or maximum dimension can be a length, width, or diameter.

In some embodiments, the present disclosure relates to the incorporation of additives into the process, into the product, or both. In some embodiments, the halogenated biogenic activated carbon includes at least one process additive incorporated during the process. In these or other embodiments, the halogenated activated carbon includes at least one product additive introduced to the halogenated activated carbon following the process.

In some embodiments, the present disclosure relates to the incorporation of additives into the process, into the product, or both. In some embodiments, the halogenated biogenic activated carbon includes at least one process additive incorporated during the process. In these or other embodiments, the reagent includes at least one product additive introduced to the reagent following the process.

In some embodiments, a halogenated biogenic activated carbon comprises, on a dry basis:

55 wt % or more total carbon;

a halogenated compound and a salt present in a total amount of about 0.2 wt % to about 20 wt %;

5 wt % or less hydrogen;

1 wt % or less nitrogen;

optionally from 0.5 wt % to 10 wt % oxygen;

0.5 wt % or less phosphorus;

0.2 wt % or less sulfur; and an additive selected from a metal, a metal oxide, a metal hydroxide, or a combination thereof.

The additive may be selected from, but is by no means limited to, iron chloride, iron bromide, magnesium, manganese, aluminum, nickel, chromium, silicon, magnesium oxide, dolomite, dolomitic lime, fluorite, fluorospar, bentonite, calcium oxide, lime, or combinations thereof.

In some embodiments, a halogenated biogenic activated carbon comprises, on a dry basis:

55 wt % or more total carbon;
a halogenated compound and a salt present in a total amount of about 0.2 wt % to about 20 wt %;
5 wt % or less hydrogen;
1 wt % or less nitrogen;
optionally from 0.5 wt % to 10 wt % oxygen;
0.5 wt % or less phosphorus;
0.2 wt % or less sulfur; and
an additive selected from an acid, a base, or a salt thereof.

The additive may be selected from, but is by no means limited to, sodium hydroxide, potassium hydroxide, magnesium oxide, sodium silicate, potassium permanganate, organic acids (e.g., citric acid), or combinations thereof.

In certain embodiments, a biogenic activated carbon comprises, on a dry basis:

55 wt % or more total carbon;
a halogenated compound and a salt present in a total amount of about 0.2 wt % to about 20 wt %;
5 wt % or less hydrogen;
1 wt % or less nitrogen;
optionally from 0.5 wt % to 10 wt % oxygen;
0.5 wt % or less phosphorus;
0.2 wt % or less sulfur;
a first additive selected from a metal, metal oxide, metal hydroxide, or a combination thereof; and
a second additive selected from an acid, a base, or a salt thereof,
wherein the first additive is different from the second additive.

The first additive may be selected from magnesium, manganese, aluminum, nickel, chromium, silicon, magnesium oxide, dolomite, dolomitic lime, bentonite, calcium oxide, lime, or combinations thereof, while the second additive may be independently selected from sodium hydroxide, potassium hydroxide, magnesium oxide, sodium silicate, potassium permanganate, organic acids (e.g., citric acid), or combinations thereof.

In one embodiment, a halogenated biogenic activated carbon consistent with the present disclosure consists essentially of, on a dry basis, carbon, hydrogen, nitrogen, oxygen, phosphorus, sulfur, non-combustible matter, and an additive selected from the group consisting of magnesium, manganese, aluminum, nickel, chromium, silicon, magnesium oxide, dolomite, dolomitic lime, bentonite, calcium oxide, lime, and combinations thereof.

In one embodiment, a halogenated biogenic activated carbon consistent with the present disclosure consists essentially of, on a dry basis, carbon, hydrogen, nitrogen, oxygen, phosphorus, sulfur, non-combustible matter, a halogenated compound, a salt, and an additive selected from the group consisting of sodium hydroxide, potassium hydroxide, magnesium oxide, sodium silicate, and combinations thereof.

The amount of additive (or total additives) may vary widely, such as from about 0.01 wt % to about 25 wt %, including about 0.1 wt %, about 1 wt %, about 5 wt %, about 10 wt %, or about 20 wt % on a dry basis. It will be appreciated then when relatively large amounts of additives are incorporated, such as higher than about 1 wt %, there will be a reduction in energy content calculated on the basis of the total activated carbon weight (inclusive of additives).

Still, in various embodiments, the halogenated biogenic activated carbon with additive(s) may possess an energy content of about at least 11,000 Btu/lb, at least 12,000 Btu/lb, at least 13,000 Btu/lb, at least 14,000 Btu/lb, or at least 15,000 Btu/lb, when based on the entire weight of the biogenic activated carbon (including the additive(s)).

The above discussion regarding product form applies also to embodiments that incorporate additives. In fact, certain embodiments incorporate additives as binders or other modifiers to enhance final properties for a particular application.

In some embodiments, the majority of carbon contained in the halogenated biogenic activated carbon is classified as renewable carbon. In some embodiments, substantially all of the carbon is classified as renewable carbon. There may be certain market mechanisms (e.g., Renewable Identification Numbers, tax credits, etc.) wherein value is attributed to the renewable carbon content within the halogenated biogenic activated carbon. In some embodiments, the additive itself is derived from biogenic sources or is otherwise classified as derived from a renewable carbon source. For example, some organic acids such as citric acid are derived from renewable carbon sources. Thus, in some embodiments, the carbon content of a halogenated biogenic activated carbon consists of, consists essentially of, or consists of renewable carbon. For example, a fully biogenic halogenated activated carbon formed by methods as disclosed herein consist of, consist essentially of, or consist substantially of (a) pyrolyzed solids derived solely from biomass from renewable carbon sources, (b) a halogenated compound derived from renewable sources, and (c) a salt derived from renewable sources.

The halogenated biogenic activated carbon compositions produced as described herein are useful for a wide variety of carbonaceous products. In embodiments, a product includes any of the halogenated biogenic activated carbons that may be obtained by the disclosed processes, or that are described in the compositions set forth herein, or any portions, combinations, or derivatives thereof.

Generally speaking, the halogenated biogenic activated carbons may be combusted to produce energy (including electricity and heat); partially oxidized or steam-reformed to produce syngas; utilized for their adsorptive or absorptive properties; utilized for their reactive properties during metal refining (such as reduction of metal oxides) or other industrial processing; or utilized for their material properties in carbon steel and various other metal alloys. Essentially, the halogenated biogenic activated carbons may be utilized for any market application of carbon-based commodities or advanced materials (e.g., graphene), including specialty uses to be developed.

Halogenated biogenic activated carbon compositions prepared according to the processes disclosed herein have the same or better characteristics as traditional fossil fuel-based activated carbon. In some embodiments, halogenated biogenic activated carbon has a surface area that is comparable to, equal to, or greater than surface area associated with fossil fuel-based activated carbon. In some embodiments, halogenated biogenic activated carbon can control pollutants as well as or better than traditional activated carbon products. In some embodiments, halogenated biogenic activated carbon has an inert material (e.g., ash) level that is comparable to, equal to, or less than an inert material (e.g., ash) level associated with a traditional activated carbon product. In some embodiments, halogenated biogenic activated carbon has a particle size and/or a particle size distribution that is comparable to, equal to, greater than, or less than a particle size and/or a particle size distribution associated with a traditional activated carbon product. In some embodiments, a halogenated biogenic activated carbon product has a particle shape that is comparable to, substantially similar to, or the same as a particle shape associated with a traditional activated carbon product. In some embodiments, a halogenated biogenic activated carbon product has a particle shape that is substantially different than a particle shape associated with a traditional activated carbon product. In some embodiments, a halogenated biogenic activated carbon product has a pore volume that is comparable to, equal to, or greater than a pore volume associated with a traditional activated carbon product. In some embodiments, a halogenated biogenic activated carbon product has pore dimensions that are comparable to, substantially similar to, or the same as pore dimensions associated with a traditional activated carbon product. In some embodiments, a halogenated biogenic activated product has an attrition resistance of particles value that is comparable to, substantially similar to, or the same as an attrition resistance of particles value associated with a traditional activated carbon product. In some embodiments, a halogenated biogenic activated carbon product has a hardness value that is comparable to, substantially similar to, or the same as a hardness value associated with a traditional activated carbon product. In some embodiments, a halogenated biogenic activated carbon product has a hardness value that is comparable to, substantially less than, or less than a hardness value associated with a traditional activated carbon product. In some embodiments, a halogenated biogenic activated carbon product has a bulk density value that is comparable to, substantially similar to, or the same as a bulk density value associated with a traditional activated carbon product. In some embodiments, a halogenated biogenic activated carbon product has a bulk density value that is comparable to, substantially less than, or less than a bulk density value associated with a traditional activated carbon product. In some embodiments, a halogenated biogenic activated carbon product has an absorptive capacity that is comparable to, substantially similar to, or the same as an absorptive capacity associated with a traditional activated carbon product.

Prior to suitability or actual use in any product applications, the disclosed halogenated biogenic activated carbons may be analyzed, measured, and optionally modified (such as through additives) in various ways. Some properties of potential interest, other than chemical composition and energy content, include density, particle size, surface area, microporosity, absorptivity, adsorptivity, binding capacity, reactivity, desulfurization activity, basicity, hardness, and Iodine Number.

In one embodiment, the present disclosure provides various halogenated activated carbon products. Halogenated activated carbon is used in a wide variety of liquid and gas-phase applications, including water treatment, air purification, solvent vapor recovery, food and beverage processing, sugar and sweetener refining, automotive uses, and pharmaceuticals. For halogenated activated carbon, key product attributes may include particle size, shape, and composition; surface area, pore volume and pore dimensions, particle-size distribution, the chemical nature of the carbon surface and interior, attrition resistance of particles, hardness, bulk density, and adsorptive capacity.

The surface area of the halogenated biogenic activated carbon may vary widely. Exemplary surface areas range from about 400 $m^2/g$ to about 2000 $m^2/g$ or higher, such as about 500 $m^2/g$, 600 $m^2/g$, 800 $m^2/g$, 1000 $m^2/g$, 1200 $m^2/g$, 1400 $m^2/g$, 1600 $m^2/g$, or 1800 $m^2/g$. Surface area generally correlates to adsorption capacity.

The Iodine Number is a parameter used to characterize activated carbon performance. The Iodine Number measures the degree of activation of the carbon, and is a measure of micropore (e.g., 0-20 Å) content. It is an important measurement for liquid-phase applications. Exemplary Iodine Numbers for halogenated activated carbon products produced by embodiments of the disclosure include about 500, 600, 750, 900, 1000, 1100, 1200, 1300, 1500, 1600, 1750, 1900, 2000, 2100, and 2200.

Other pore-related measurements include Methylene Blue, which measures mesopore content (e.g., 20-500 Å); and Molasses Number, which measures mesopore and macropore content (e.g., >500 Å), and Tannin Value, which measures mesopore and macropore content. The pore-size distribution and pore volume are important to determine ultimate performance. A typical bulk density for the halogenated biogenic activated carbon compositions disclosed herein is about 400 to 500 g/liter, such as about 450 g/liter.

In some embodiments, the disclosure provides a halogenated activated carbon product, wherein the product has a mesoporosity characterized by mesopore volume of at least about 0.5 cubic centimeters per gram of activated carbon product ($cm^3/g$), such as a mesopore volume of at least about 0.55, 0.60, 0.65, 0.70, 0.75, 0.80, 0.85, 0.90, 0.95, 1.0, or more cubic centimeters per gram. "Mesopores" are defined as pores with pore sizes from 2 nm to 50 nm. Pores smaller than 2 nm are "micropores," and pores larger than 50 nm are "macropores."

In some embodiments, the disclosure provides a halogenated activated carbon product, wherein the product is characterized by a Molasses Number of about 500 or greater, such as a Molasses Number of about 550, 600, 650, 700, 750, 800, 850, 900, 950, 1000, 1030, 1060, or greater. The Molasses Number may be measured, for example, by Standard Method Calgon TM-3.

In some embodiments, the disclosure provides a halogenated activated carbon product, wherein the product is characterized by a Tannin Value of about 100 or less, such as a Tannin Value of about 75, 70, 65, 60, 55, 50, 45, 40, 35, or less. The Tannin Value may be measured, for example, by Standard Method AWWA B600-10.

In some embodiments, a halogenated activated carbon product has a mesoporosity characterized by mesopore volume of at least about 0.5 cubic centimeters per gram, a Molasses Number of about 500 or greater, and a Tannin Value of about 100 or less.

In certain embodiments, a halogenated activated carbon product has a mesoporosity characterized by mesopore volume of at least about 0.7 cubic centimeters per gram, a Molasses Number of about 1000 or greater, and a Tannin Value of about 35 or less.

The halogenated activated carbon product may be further characterized by a total pore volume of at least about 0.85 cubic centimeters per gram. The halogenated activated carbon product may be further characterized by a BET surface area of at least about 800 square meters per gram.

The halogenated activated carbon product may be further characterized by MIB/Geosmin removal or other suitable tests. For example, removal of MIB according to Standard Method AWWA B600-10 may be about 85%, 90%, 93%, or higher. Removal of Geosmin according to Standard Method AWWA B600-10 may be about 90%, 95%, 99%, or higher.

Hardness or Abrasion Number is measure of activated carbon's resistance to attrition. It is an indicator of activated carbon's physical integrity to withstand frictional forces and mechanical stresses during handling or use. Some amount of hardness is desirable, but if the hardness is too high, excessive equipment wear can result. Exemplary Abrasion Numbers, measured according to ASTM D3802, for halogenated activated carbon compositions disclosed herein range from about 1% to greater than about 99%, such as about 1%, about 5%, about 10%, about 15%, about 20%, about 25%, about 30%, about 35%, about 40%, about 45%, about 50%, about 55%, 60%, about 65%, about 70%, about 75%, about 80%, about 85%, about 90%, about 95%, about 96%, about 97%, about 98%, about 99%, or greater than about 99%.

In some embodiments, an optimal range of hardness can be achieved in which the halogenated biogenic activated carbon is reasonably resistant to attrition but does not cause abrasion and wear in capital facilities that process the halogenated activated carbon. This optimum is made possible in some embodiments of this disclosure due to the selection of feedstock as well as processing conditions.

For example, it is known that coconut shells tend to produce Abrasion Numbers of 99% or higher, so coconut shells would be a less-than-optimal feedstock for achieving optimum hardness. In some embodiments in which the downstream use can handle high hardness, the process of this disclosure may be operated to increase or maximize hardness to produce halogenated biogenic activated carbon products having an Abrasion Number of about 75%, about 80%, about 85%, about 90%, about 95%, about 96%, about 97%, about 98%, about 99%, or greater than about 99%.

The halogenated biogenic activated carbon compositions provided by the present disclosure have a wide range of commercial uses. For example, without limitation, the halogenated biogenic activated carbon compositions may be utilized in emissions control, water purification, groundwater treatment, wastewater treatment, air stripper applications, PCB removal applications, odor removal applications, soil vapor extractions, manufactured gas plants, industrial water filtration, industrial fumigation, tank and process vents, pumps, blowers, filters, pre-filters, mist filters, ductwork, piping modules, adsorbers, absorbers, and columns, energy storage and capacitance.

In one embodiment, the present disclosure provides a method of using a halogenated biogenic activated carbon composition to reduce emissions, the method comprising:

(a) providing halogenated activated carbon particles comprising a biogenic activated carbon composition;

(b) providing a gas-phase emissions stream comprising at least one selected contaminant;

(c) introducing the activated carbon particles and the additive into the gas-phase emissions stream, to adsorb at least a portion of the selected contaminant onto the halogenated activated carbon particles, thereby generating contaminant-adsorbed halogenated activated carbon particles within the gas-phase emissions stream; and (d) separating at least a portion of the contaminant-adsorbed carbon particles from the gas-phase emissions stream, to produce a contaminant-reduced gas-phase emissions stream.

A selected contaminant (in the gas-phase emissions stream) may be a metal, such as a metal is selected from the group consisting of mercury, boron, selenium, arsenic, and any compound, salt, and mixture thereof. A selected contaminant may be a hazardous air pollutant, an organic compound (such as a VOC), or a non-condensable gas, for example. In some embodiments, a halogenated biogenic activated carbon product adsorbs, absorbs and/or chemisorbs a selected contaminant in greater amounts than a comparable amount of a non-biogenic activated carbon product. In some such embodiments, the selected contaminant is a metal, a hazardous air pollutant, an organic compound (such as a VOC), a non-condensable gas, or any combination thereof. In some embodiments, the selected contaminant comprises mercury. In some embodiments, the selected contaminant comprises one or more VOCs. In some embodiments, the biogenic activated carbon comprises at least about 1 wt % hydrogen and/or at least about 10 wt % oxygen.

Hazardous air pollutants are those pollutants that cause or may cause cancer or other serious health effects, such as reproductive effects or birth defects, or adverse environmental and ecological effects. Section 112 of the Clean Air Act, as amended, is incorporated by reference herein in its entirety. Pursuant to the Section 112 of the Clean Air Act, the United States Environmental Protection Agency (EPA) is mandated to control 189 hazardous air pollutants. Any current or future compounds classified as hazardous air pollutants by the EPA are included in possible selected contaminants in the present context.

Volatile organic compounds, some of which are also hazardous air pollutants, are organic chemicals that have a high vapor pressure at ordinary, room-temperature conditions. Examples include short-chain alkanes, olefins, alcohols, ketones, and aldehydes. Many volatile organic compounds are dangerous to human health or cause harm to the environment. EPA regulates volatile organic compounds in air, water, and land. EPA's definition of volatile organic compounds is described in 40 CFR Section 51.100, which is incorporated by reference herein in its entirety.

Non-condensable gases are gases that do not condense under ordinary, room-temperature conditions. Non-condensable gas may include, but are not limited to, nitrogen oxides, carbon monoxide, carbon dioxide, hydrogen sulfide, sulfur dioxide, sulfur trioxide, methane, ethane, ethylene, ozone, ammonia, or combinations thereof.

Multiple contaminants may be removed by the halogenated activated carbon particles disclosed herein. In some embodiments, the contaminant-adsorbed halogenated carbon particles include at least two contaminants, at least three contaminants, or more. The halogenated biogenic activated carbon compositions disclosed herein can allow multi-pollutant control as well as control of certain targeted pollutants (e.g. selenium).

In some embodiments, the contaminant-adsorbed halogenated activated carbon particles include at least one, at least two, at least three, or all of, carbon dioxide, nitrogen oxides, mercury, and sulfur dioxide (in any combination).

The separation in step (d) may include filtration (e.g., fabric filters) or electrostatic precipitation (ESP), for example. Fabric filters, also known as baghouses, may utilize engineered fabric filter tubes, envelopes, or cartridges, for example. There are several types of baghouses, including pulse-jet, shaker-style, and reverse-air systems. The separation in step (d) may also include scrubbing.

An electrostatic precipitator, or electrostatic air cleaner, is a particulate collection device that removes particles from a flowing gas using the force of an induced electrostatic charge. Electrostatic precipitators are highly efficient filtration devices that minimally impede the flow of gases through the device, and can easily remove fine particulate matter from the air stream. An electrostatic precipitator applies energy only to the particulate matter being collected and therefore is very efficient in its consumption of energy (electricity).

The electrostatic precipitator may be dry or wet. A wet electrostatic precipitator operates with saturated gas streams to remove liquid droplets such as sulfuric acid mist from industrial process gas streams. Wet electrostatic precipitators may be useful when the gases are high in moisture content, contain combustible particulate, or have particles that are sticky in nature.

In some embodiments, the contaminant-adsorbed halogenated activated carbon particles are treated to regenerate the activated carbon particles. In some embodiments, the method includes thermally oxidizing the contaminant-adsorbed halogenated activated carbon particles. The contaminant-adsorbed halogenated activated carbon particles, or a regenerated form thereof, may be combusted to provide energy.

In some embodiments, the gas-phase emissions stream is derived from combustion of a fuel comprising the halogenated biogenic activated carbon composition.

In some embodiments relating specifically to mercury removal, a method of using a halogenated biogenic activated carbon composition to reduce mercury emissions comprises:

(a) providing halogenated activated carbon particles comprising a biogenic activated carbon composition that includes iron or an iron-containing compound;

(b) providing a gas-phase emissions stream comprising mercury;

(c) introducing the halogenated activated carbon particles into the gas-phase emissions stream, to adsorb at least a portion of the mercury onto the activated carbon particles, thereby generating mercury-adsorbed carbon particles within the gas-phase emissions stream; and (d) separating at least a portion of the mercury-adsorbed halogenated carbon particles from the gas-phase emissions stream using electrostatic precipitation or filtration, to produce a mercury-reduced gas-phase emissions stream.

In some embodiments, a method of using a halogenated biogenic activated carbon composition to reduce emissions (e.g., mercury) further comprises using the halogenated biogenic activated carbon as a fuel source. In such embodiments, the high heat value of the halogenated biogenic activated carbon product can be utilized in addition to its ability to reduce emissions by adsorbing, absorbing and/or chemisorbing potential pollutants. Thus, in an example embodiment, the halogenated biogenic activated carbon product, when used as a fuel source and as a mercury control product, prevents at least 70% of mercury from emanating from a power plant, for example about 70%, about 75%, about 80%, about 85%, about 90%, about 95%, about 96%, about 97%, about 98%, 98.5%, about 99%, about 99.1%, about 99.2%, about 99.3%, about 99.4%, about 99.5%, about 99.6%, about 99.7%, about 99.8%, about 99.9%, or greater than about 99.9% of mercury.

As an exemplary embodiment, halogenated biogenic activated carbon may be injected (such as into the ductwork) upstream of a particulate matter control device, such as an electrostatic precipitator or fabric filter. In some cases, a flue gas desulfurization (dry or wet) system may be downstream of the halogenated activated carbon injection point. The halogenated activated carbon may be pneumatically injected as a powder. The injection location will typically be determined by the existing plant configuration (unless it is a new site) and whether additional downstream particulate matter control equipment is modified.

For boilers currently equipped with particulate matter control devices, implementing halogenated biogenic activated carbon injection for mercury control could entail: (i) injection of powdered halogenated activated carbon upstream of the existing particulate matter control device (electrostatic precipitator or fabric filter); (ii) injection of powdered halogenated activated carbon downstream of an existing electrostatic precipitator and upstream of a retrofit fabric filter; or (iii) injection of powdered halogenated activated carbon between electrostatic precipitator electric fields.

In some embodiments, powdered halogenated biogenic activated carbon injection approaches may be employed in combination with existing $SO_2$ control devices. Halogenated activated carbon could be injected prior to the $SO_2$ control device or after the $SO_2$ control device, subject to the availability of a means to collect the halogenated activated carbon sorbent downstream of the injection point.

When electrostatic precipitation is employed, the presence of iron or an iron-containing compound in the halogenated activated carbon particles can improve the effectiveness of electrostatic precipitation, thereby further improving a process of controlling mercury emissions.

The method optionally further includes separating the mercury-adsorbed halogenated carbon particles, containing the iron or an iron-containing compound, from carbon or ash particles that do not contain the iron or an iron-containing compound. The carbon or ash particles that do not contain the iron or an iron-containing compound may be recovered for recycling, selling as a co-product, or other use. Any separations involving iron or materials containing iron may employ magnetic separation, taking advantage of the magnetic properties of iron.

A halogenated biogenic activated carbon composition that includes iron or an iron-containing compound may be a "magnetic activated carbon" product. That is, the material is susceptible to a magnetic field. The iron or iron-containing compound may be separated using magnetic separation devices. Additionally, the halogenated biogenic activated carbon, which includes iron, may be separated using magnetic separation. When magnetic separation is to be employed, magnetic metal separators may be magnet cartridges, plate magnets, or another suitable configuration.

Inclusion of iron or iron-containing compounds may drastically improve the performance of electrostatic precipitators for mercury control. Furthermore, inclusion of iron or iron-containing compounds may drastically change end-of-life options, since the spent activated carbon solids may be separated from other ash.

In some embodiments, a magnetic halogenated activated carbon product can be separated out of the ash stream. Under the ASTM standards for use of fly ash in cement, the fly ash must come from coal products. If wood-based activated carbon can be separated from other fly ash, the remainder of the ash may be used per the ASTM standards for cement production. Similarly, the ability to separate mercury-laden ash may allow it to be better handled and disposed of, potentially reducing costs of handling all ash from a certain facility.

In some embodiments, the same physical material may be used in multiple processes, either in an integrated way or in sequence. Thus, for example, a halogenated activated carbon may, at the end of its useful life as a performance material, then be introduced to a combustion process for energy value or to a metal process, etc.

For example, a halogenated activated carbon injected into an emissions stream may be suitable to remove contaminants, followed by combustion of the activated carbon particles and possibly the contaminants, to produce energy and thermally destroy or chemically oxidize the contaminants.

In some embodiments, the present disclosure provides a process for energy production comprising:

(a) providing a carbon-containing feedstock comprising a halogenated biogenic activated carbon composition (which may optionally include one or more additives); and (b) oxidizing the carbon-containing feedstock to generate energy and a gas-phase emissions stream, wherein the presence of the halogenated biogenic activated carbon composition within the carbon-containing feedstock is effective to adsorb at least one contaminant produced as a byproduct of the oxidizing or derived from the carbon-containing feedstock, thereby reducing emissions of the contaminant.

In some embodiments, the contaminant, or a precursor thereof, is contained within the carbon-containing feedstock. In other embodiments, the contaminant is produced as a byproduct of the oxidizing.

The carbon-containing feedstock may further include biomass, coal, or any other carbonaceous material, in addition to the halogenated biogenic activated carbon composition. In certain embodiments, the carbon-containing feedstock consists essentially of the halogenated biogenic activated carbon composition as the sole fuel source.

The selected contaminant may be a metal selected from the group consisting of mercury, boron, selenium, arsenic, and any compound, salt, and mixture thereof; a hazardous air pollutant; an organic compound (such as a VOC); a non-condensable gas selected from the group consisting of nitrogen oxides, carbon monoxide, carbon dioxide, hydrogen sulfide, sulfur dioxide, sulfur trioxide, methane, ethane, ethylene, ozone, and ammonia; or any combinations thereof. In some embodiments, a halogenated biogenic activated carbon product adsorbs, absorbs and/or chemisorbs a selected contaminant in greater amounts than a comparable amount of a non-biogenic activated carbon product. In some such embodiments, the selected contaminant is a metal, a hazardous air pollutant, an organic compound (such as a VOC), a non-condensable gas, or any combination thereof. In some embodiments, the selected contaminant comprises mercury. In some embodiments, the selected contaminant comprises one or more VOCs. In some embodiments, the halogenated biogenic activated carbon comprises at least about 1 wt % hydrogen and/or at least about 10 wt % oxygen.

The halogenated biogenic activated carbon and the principles of the disclosure may be applied to liquid-phase applications, including processing of water, aqueous streams of varying purities, solvents, liquid fuels, polymers, molten salts, and molten metals, for example. As intended herein, "liquid phase" includes slurries, suspensions, emulsions, multiphase systems, or any other material that has (or may be adjusted to have) at least some amount of a liquid state present.

In one embodiment, the present disclosure provides a method of using a halogenated biogenic activated carbon composition to purify a liquid, the method comprising:

(a) providing halogenated activated carbon particles comprising a biogenic activated carbon composition;

(b) providing a liquid comprising at least one selected contaminant; and (c) contacting the liquid with the halogenated activated carbon particles to adsorb at least a portion of the at least one selected contaminant onto the activated carbon particles, thereby generating contaminant-adsorbed carbon particles and a contaminant-reduced liquid.

In some embodiments, the selected contaminant (in the liquid to be treated) is a metal, such as a metal selected from the group consisting of arsenic, boron, selenium, mercury, and any compound, salt, and mixture thereof. In some embodiments, the selected contaminant is an organic compound (such as a VOC), a halogen, a biological compound, a pesticide, or a herbicide. The contaminant-adsorbed halogenated carbon particles may include two, three, or more contaminants. In some embodiments, a halogenated biogenic activated carbon product adsorbs, absorbs and/or chemisorbs a selected contaminant in greater amounts than a comparable amount of a non-biogenic activated carbon product. In some such embodiments, the selected contaminant is a metal, a hazardous air pollutant, an organic compound (such as a VOC), a non-condensable gas, or any combination thereof. In some embodiments, the selected contaminant comprises mercury. In some embodiments, the selected contaminant comprises one or more VOCs. In some embodiments, the halogenated biogenic activated carbon comprises at least about 1 wt % hydrogen and/or at least about 10 wt % oxygen.

The liquid to be treated will typically be aqueous, although that is not necessary for the principles of this disclosure. In some embodiments, step (c) includes contacting the liquid with the halogenated activated carbon particles in a fixed bed. In other embodiments, step (c) includes contacting the liquid with the halogenated activated carbon particles in solution or in a moving bed.

In one embodiment, the present disclosure provides a method of using a halogenated biogenic activated carbon composition to remove at least a portion of a sulfur-containing contaminant from a liquid, the method comprising:

(a) providing halogenated activated-carbon particles comprising a biogenic activated carbon composition;

(b) providing a liquid containing a sulfur-containing contaminant; and (c) contacting the liquid with the halogenated activated-carbon particles to adsorb or absorb at least a portion of the sulfur-containing contaminant onto or into the halogenated activated-carbon particles.

In some embodiments, the sulfur-containing contaminant is selected from the group consisting of elemental sulfur, sulfuric acid, sulfurous acid, sulfur dioxide, sulfur trioxide, sulfate anions, bisulfate anions, sulfite anions, bisulfite anions, thiols, sulfides, disulfides, polysulfides, thioethers, thioesters, thioacetals, sulfoxides, sulfones, thiosulfinates, sulfimides, sulfoximides, sulfonediimines, sulfur halides, thioketones, thioaldehydes, sulfur oxides, thiocarboxylic acids, thioamides, sulfonic acids, sulfinic acids, sulfenic acids, sulfonium, oxosulfonium, sulfuranes, persulfuranes, and combinations, salts, or derivatives thereof. For example, the sulfur-containing contaminant may be a sulfate, in anionic and/or salt form.

In some embodiments, the halogenated biogenic activated carbon composition comprises 55 wt % or more total carbon; a halogenated compound and a salt in a total amount of about 0.2 wt % to about 20 wt %; 15 wt % or less hydrogen; and 1 wt % or less nitrogen.

In some embodiments, step (c) includes filtration of the liquid. In these or other embodiments, step (c) includes osmosis of the liquid. The halogenated activated-carbon particles may be directly introduced to the liquid prior to osmosis. The halogenated activated-carbon particles may be employed in pre-filtration prior to osmosis. In certain embodiments, the halogenated activated-carbon particles are incorporated into a membrane for osmosis. For example, known membrane materials such as cellulose acetate may be modified by introducing the halogenated activated-carbon particles within the membrane itself or as a layer on one or both sides of the membrane. Various thin-film carbon-containing composites could be fabricated with the halogenated activated-carbon particles and additives.

In some embodiments, step (c) includes direct addition of the halogenated activated-carbon particles to the liquid, followed by for example sedimentation of the halogenated activated-carbon particles with the sulfur-containing contaminant from the liquid.

The liquid may be an aqueous liquid, such as water. In some embodiments, the water is wastewater associated with a process selected from the group consisting of metal mining, acid mine drainage, mineral processing, municipal sewer treatment, pulp and paper, ethanol, and any other industrial process that is capable of discharging sulfur-containing contaminants in wastewater. The water may also be (or be part of) a natural body of water, such as a lake, river, or stream.

In one embodiment, the present disclosure provides a process to reduce the concentration of sulfates in water, the process comprising:

(a) providing halogenated activated-carbon particles comprising a biogenic activated carbon composition;

(b) providing a volume or stream of water containing sulfates; and (c) contacting the water with the activated-carbon particles and the additive, to adsorb or absorb at least a portion of the sulfates onto or into the activated-carbon particles.

In some embodiments, the sulfates are reduced to a concentration of about 50 mg/L or less in the water, such as a concentration of about 10 mg/L or less in the water. In some embodiments, the sulfates are reduced, as a result of absorption and/or adsorption into the biogenic activated carbon composition, to a concentration of about 100 mg/L, 75 mg/L, 50 mg/L, 25 mg/L, 20 mg/L, 15 mg/L, 12 mg/L, 10 mg/L, 8 mg/L, or less in the wastewater stream. In some embodiments, the sulfate is present primarily in the form of sulfate anions and/or bisulfate anions. Depending on pH, the sulfate may also be present in the form of sulfate salts.

The water may be derived from, part of, or the entirety of a wastewater stream. Exemplary wastewater streams are those that may be associated with a metal mining, acid mine drainage, mineral processing, municipal sewer treatment, pulp and paper, ethanol, or any other industrial process that could discharge sulfur-containing contaminants to wastewater. The water may be a natural body of water, such as a lake, river, or stream. In some embodiments, the process is conducted continuously. In other embodiments, the process is conducted in batch.

The halogenated biogenic activated carbon composition comprises 55 wt % or more total carbon; a halogenated compound and a salt in a total amount of about 0.2 wt % to about 20 wt %; 15 wt % or less hydrogen; and 1 wt % or less nitrogen, in some embodiments.

Step (c) may include, but is not limited to, filtration of the water, osmosis of the water, and/or direct addition (with sedimentation, clarification, etc.) of the activated-carbon particles to the water.

When osmosis is employed, the halogenated activated carbon can be used in several ways within, or to assist, an osmosis device. In some embodiments, the halogenated activated-carbon particles are directly introduced to the water prior to osmosis. The halogenated activated-carbon particles are optionally employed in pre-filtration prior to the osmosis. In certain embodiments, the halogenated activated-carbon particles are incorporated into a membrane for osmosis.

The present disclosure also provides a method of using a halogenated biogenic activated carbon composition to remove a sulfur-containing contaminant from a gas phase, the method comprising:

(a) providing halogenated activated-carbon particles comprising a biogenic activated carbon composition;

(b) providing a gas-phase emissions stream comprising at least one sulfur-containing contaminant;

(c) introducing the activated-carbon particles and the additive into the gas-phase emissions stream, to adsorb or absorb at least a portion of the sulfur-containing contaminant onto the activated-carbon particles; and (d) separating at least a portion of the activated-carbon particles from the gas-phase emissions stream.

In some embodiments, the sulfur-containing contaminant is selected from the group consisting of elemental sulfur, sulfuric acid, sulfurous acid, sulfur dioxide, sulfur trioxide, sulfate anions, bisulfate anions, sulfite anions, bisulfite anions, thiols, sulfides, disulfides, polysulfides, thioethers, thioesters, thioacetals, sulfoxides, sulfones, thiosulfinates, sulfimides, sulfoximides, sulfonediimines, sulfur halides, thioketones, thioaldehydes, sulfur oxides, thiocarboxylic acids, thioamides, sulfonic acids, sulfinic acids, sulfenic acids, sulfonium, oxosulfonium, sulfuranes, persulfuranes, and combinations, salts, or derivatives thereof.

The halogenated biogenic activated carbon composition may include 55 wt % or more total carbon; a halogenated compound and a salt in a total amount of about 0.2 wt % to about 20 wt %; 15 wt % or less hydrogen; 1 wt % or less nitrogen; and an optional additive selected from an acid, a base, a salt, a metal, a metal oxide, a metal hydroxide, or a combination thereof. The optional additive may be provided as part of the activated-carbon particles, or may be introduced directly into the gas-phase emissions stream.

In some embodiments, the gas-phase emissions stream is derived from combustion of a fuel comprising the halogenated biogenic activated carbon composition. For example, the gas-phase emissions stream may be derived from co-combustion of coal and the halogenated biogenic activated carbon composition.

In some embodiments, separating in step (d) comprises filtration. In these or other embodiments, separating in step (d) comprises electrostatic precipitation. In any of these embodiments, separating in step (d) may include scrubbing, which may be wet scrubbing, dry scrubbing, or another type of scrubbing.

The halogenated biogenic activated carbon composition may further comprise 0.5 wt % or less phosphorus; and 0.2 wt % or less sulfur.

The contaminant-adsorbed halogenated activated carbon particles may be further treated to regenerate the halogenated activated carbon particles. After regeneration, the halogenated activated carbon particles may be reused for contaminant removal, or may be used for another purpose, such as combustion to produce energy. In some embodiments, the contaminant-adsorbed halogenated activated carbon particles are directly oxidized (without regeneration) to produce energy. In some embodiments, the oxidation occurs in the presence of an emissions control device (e.g., a second amount of fresh or regenerated activated carbon particles) to capture contaminants released from the oxidation of the contaminant-adsorbed halogenated activated carbon particles.

In some embodiments, halogenated biogenic activated carbon according to the present disclosure can be used in any other application in which traditional activated carbon (e.g., halogenated activated carbon) might be used. In some embodiments, the halogenated biogenic activated carbon is used as a total (i.e., 100%) replacement for traditional halogenated activated carbon. In some embodiments, halogenated biogenic activated carbon comprises essentially all or substantially all of the activated carbon used for a particular application. In some embodiments, a halogenated activated carbon composition comprises about 1% to about 100% of halogenated biogenic activated carbon, for example, about 1%, about 2%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, or about 100% halogenated biogenic activated carbon.

For example and without limitation, halogenated biogenic activated carbon can be used-alone or in combination with a traditional halogenated activated carbon product—in filters. In some embodiments, a filter comprises an halogenated activated carbon component consisting of, consisting essentially of, or consisting of a halogenated biogenic activated carbon. In some embodiments, a filter comprises a halogenated activated carbon component comprising about 1% to about 100% of halogenated biogenic activated carbon, for example, about 1%, about 2%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, or about 100% halogenated biogenic activated carbon.

In some embodiments, a packed bed or packed column comprises a halogenated activated carbon component consisting of, consisting essentially of, or consisting of a halogenated biogenic activated carbon. In some embodiments, a packed bed or packed column comprises a halogenated activated carbon component comprising about 1% to about 100% of halogenated biogenic activated carbon, for example, about 1%, about 2%, about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95%, about 96%, about 97%, about 98%, about 99%, or about 100% halogenated biogenic activated carbon. In such embodiments, the halogenated biogenic activated carbon has a size characteristic suitable for the particular packed bed or packed column.

The above description should not be construed as limiting in any way as to the potential applications of the halogenated biogenic activated carbon. Injection of halogenated biogenic activated carbon into gas streams may be useful for control of contaminant emissions in gas streams or liquid streams derived from coal-fired power plants, biomass-fired power plants, metal processing plants, crude-oil refineries, chemical plants, polymer plants, pulp and paper plants, cement plants, waste incinerators, food processing plants, gasification plants, and syngas plants.

Essentially any industrial process or site that employs fossil fuel or biomass for generation of energy or heat, can benefit from gas treatment by the halogenated biogenic activated carbon provided herein. For liquid-phase applications, a wide variety of industrial processes that use or produce liquid streams can benefit from treatment by the halogenated biogenic activated carbon provided herein.

Additionally, when the halogenated biogenic activated carbon is co-utilized as a fuel source, either in parallel with its use for contaminant removal or in series following contaminant removal (and optionally following some regeneration), the halogenated biogenic activated carbon (i) has lower emissions per Btu energy output than fossil fuels; (ii) has lower emissions per Btu energy output than biomass fuels; and (iii) can reduce emissions from biomass or fossil fuels when co-fired with such fuels. It is noted that the halogenated biogenic activated carbon may also be mixed with coal or other fossil fuels and, through co-combustion, the halogenated biogenic activated carbon enables reduced emissions of mercury, $SO_2$, or other contaminants.

In one embodiment, the present disclosure provides a method of using a halogenated biogenic activated carbon composition to remove at least a portion of odor-producing or taste-producing compounds, such as, but not limited to, MIB or Geosmin, from a liquid.

In one embodiment, the present disclosure provides a method of using a halogenated biogenic activated carbon composition to remove color from a material or compound, such as in sugar production.

EXAMPLES

Test Bed Preparation

As depicted in FIG. 1, a tension ring was placed into a glass tube (e.g., having an internal diameter of about ½-inch and a length of about 4 inches) and pushed three-fourths of the way down. A glass fiber filter was placed onto the tension ring. A second tension ring was then placed on top of the glass fiber filter to keep the glass fiber filter from moving. Approximately 16.3 milligrams of a halogenated activated carbon composition was placed on the glass fiber filter. A third tension ring was placed into the glass tube one-fourth of the way down. Three glass fiber filters were then placed on top of the ring, followed by another tension ring. The glass tube was labeled with the sample I.D. and placed into the adsorption analysis setup described in more detail below.

Test Bed Analysis

Figure 2:
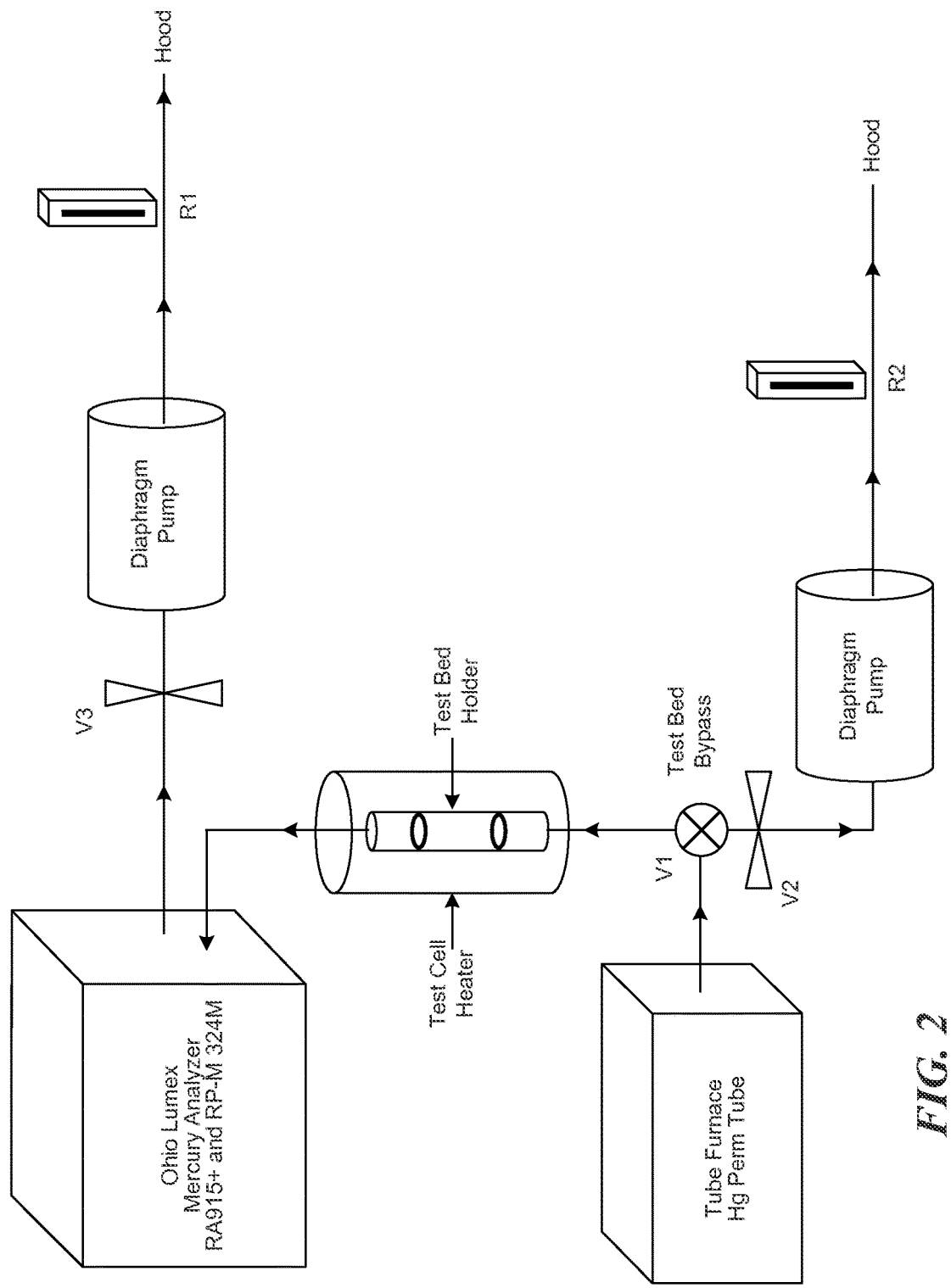
FIG. 2 is a schematic representation of a mercury vapor adsorption analysis system configured according to one embodiment of the present disclosure.

For mercury adsorption analysis, an analysis system consistent with FIG. 2 (e.g., an Ohio Lumex mercury analyzer such as model RA915+ and RP-M 324M) was used. Mercury vapor was generated from a mercury perm tube that was placed inside a quartz glass tube. The quartz tube was located in a Lindberg tube furnace which was heated to 125° C. A diaphragm pump was used to pull the mercury vapor-laden air through the test bed and analyzer at a rate of 2 L/min.

Preparation of Samples

Various samples of halogenated activated carbon compositions consistent with the present disclosure were generated for testing. First, a 12.5% solution in water was made for each halogen compound or mixture to be tested. An amount of the 12.5% solution was sprayed onto one gram of powdered activated carbon to produce the halogenated activated carbon compositions having a desired weight-percent of the halogen species. The halogenated activated carbon compositions were allowed to air-dry overnight to produce halogenated activated carbon compositions comprising 6 wt % of the halogen compound or salt (e.g., 6 wt % total halide content).

Total halide content of salt mixtures (e.g., Dead Sea Salt) was determined according to Formula (1):

$$q_1 + q_2 + q_3 + \ldots q_n, \quad (1)$$

wherein $q_A$ is the amount of halogenated salt X in the salt mixture, and wherein each $q_x$ is determined according to Formula (2):

$$q_A = (Q_A)(MW_X)/(MW_A), \quad (2)$$

wherein $Q_A$ is the weight in grams of halogenated compound A in the salt mixture (e.g., as determined experimentally and/or as indicated on a certificate of analysis), $MW_X$ is the total molecular weight of halogen X in the halogenated compound (e.g., accounting for the empirical formula of halogenated compound A), and $MW_A$ is the molecular weight of halogenated compound A.

The amount of a salt mixture (e.g., Dead Sea Salt) required to produce a Y % aqueous solution may be determined according to Formula (3):

$$\text{Amount}=(Y/100)(VOL_{mL})/(q_1+q_2+q_3+\ldots q_n)/100, \quad (3)$$

wherein Amount is the amount in grams of the salt mixture required, $VOL_{mL}$ is the volume of water in milliliters, and $(q_1+q_2+q_3+\ldots q_n)$ is the total amount of halogen in the salt mixture, for example as determined by Formulas (1) and/or (2).

For example, each gram of a Dead Sea Salt composition comprising 32.67% magnesium chloride ($MgCl_2$), 23.09% potassium chloride (KCl) and 4.58% sodium chloride (NaCl) would include 326.7 mg of $MgCl_2$, 230.9 mg of KCl, and 45.8 mg of NaCl, corresponding to a total halogen amount of 380.9 mg (243.3 mg from $MgCl_2$, 109.8 mg from KCl, and 27.8 mg from NaCl).

Preparation of 10 mL of a 12.5% aqueous solution would thus require 3.28 g of the Dead Sea Salt composition described above. That 10 mL solution would include 1.25 g of total halogen (3.28 g of Dead Sea Salt×0.3809 g total halogen/g of Dead Sea Salt) and would be sufficient to prepare 20.8 g of halogenated activated carbon having a total halogen content of about 6 wt % (e.g., 0.48 mL per gram of activated carbon).

Analysis of Samples

Figure 3:
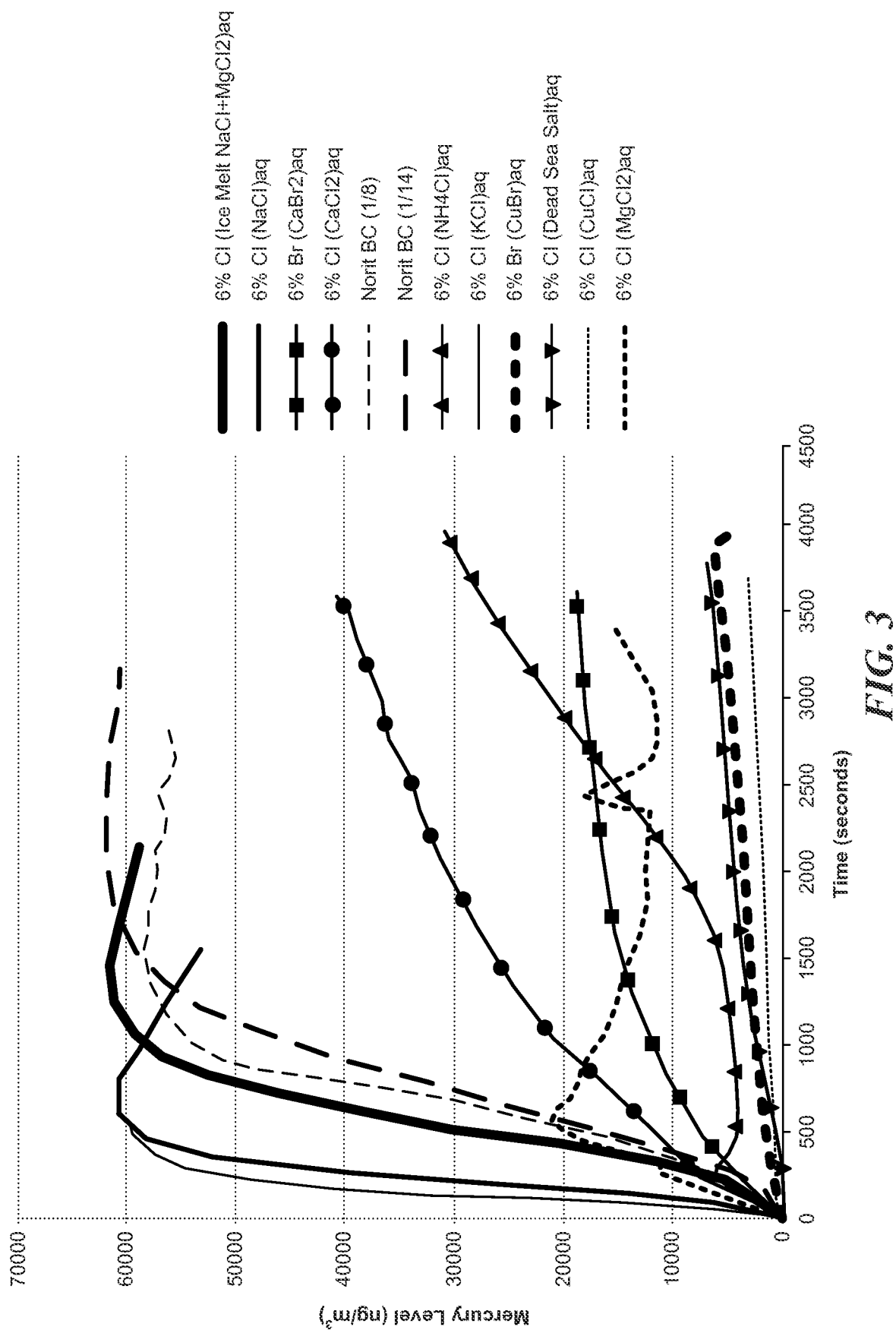
FIG. 3 is a plot of mercury breakthrough over time for various halogenated activated carbon compositions consistent with the present disclosure.

FIG. 3 shows a graph of experimental results on mercury adsorption over time based on this procedure, using various halogenated compounds/salts in activated carbon at 6 wt % total halide. Two samples of Norit BC activated carbon were also tested as comparative controls. Lower values on the y-axis correspond to lower mercury breakthrough, i.e. higher mercury adsorption into the sample. As shown in FIG. 3, the copper halide salts and the Dead Sea salt outperform most of the other materials. These data highlight the complex and unpredictable nature of the presence of additional chemical species in activated carbon compositions.

In this detailed description, reference has been made to multiple embodiments of the disclosure and non-limiting examples relating to how the disclosure can be understood and practiced. Other embodiments that do not provide all of the features and advantages set forth herein may be utilized, without departing from the spirit and scope of the present disclosure. This disclosure incorporates routine experimentation and optimization of the methods and systems described herein. Such modifications and embodiments are considered to be within the scope of the disclosure defined by the claims.

All publications, patents, and patent applications cited in this specification are herein incorporated by reference in their entirety as if each publication, patent, or patent application were specifically and individually put forth herein.

Where methods and steps described above indicate certain events occurring in certain order, those of ordinary skill in the art will recognize that the ordering of certain steps may be modified and that such modifications are in accordance with the embodiments of the disclosure. Additionally, certain of the steps may be performed concurrently in a parallel process when possible, as well as performed sequentially.

Therefore, to the extent there are embodiments of the disclosure which are within the spirit of the disclosure or equivalent to the inventions found in the appended claims, it is the intent that this patent will cover those embodiments as well. The present invention shall only be limited by what is claimed.

What is claimed is:

1. A biogenic activated carbon composition comprising:
80 wt % or more total carbon;
10 wt % or less hydrogen;
a first salt comprising a halogenated compound selected from the group consisting of copper bromide, copper chloride, and combinations thereof; and
a second salt;
wherein the halogenated compound and the second salt are present in a total amount of about 0.2 wt % to about 20 wt %, and wherein the second salt is optionally halogenated;
wherein the first salt and/or the second salt are from a naturally occurring salt mixture;
wherein the naturally occurring salt mixture is from a source selected from the group consisting of ocean water, salt lake water, rock salt, salt brine wells, and combinations thereof; and
wherein the naturally occurring salt mixture comprises Dead Sea salt.

2. A biogenic activated carbon composition comprising:
80 wt % or more total carbon;
10 wt % or less hydrogen;
a first salt comprising a halogenated compound selected from the group consisting of copper bromide, copper chloride, and combinations thereof; and
a second salt;
wherein the halogenated compound and the second salt are present in a total amount of about 0.2 wt % to about 20 wt %, and wherein the second salt is optionally halogenated;
wherein the first salt and/or the second salt are from a naturally occurring salt mixture;
wherein the naturally occurring salt mixture is from a source selected from the group consisting of ocean water, salt lake water, rock salt, salt brine wells, and combinations thereof; and
wherein the naturally occurring salt mixture comprises Dead Sea salt and Great Salt Lake salt.

3. A biogenic activated carbon composition comprising:
80 wt % or more total carbon;
10 wt % or less hydrogen;
a first salt comprising a halogenated compound selected from the group consisting of copper bromide, copper chloride, and combinations thereof; and
a second salt;
wherein the halogenated compound and the second salt are present in a total amount of about 0.2 wt % to about 20 wt %, and wherein the second salt is optionally halogenated;
wherein the first salt and/or the second salt are from a naturally occurring salt mixture;
wherein the naturally occurring salt mixture is from a source selected from the group consisting of ocean water, salt lake water, rock salt, salt brine wells, and combinations thereof; and
wherein the naturally occurring salt mixture is a mixture of Dead Sea salt and sea salt from ocean water.

4. An activated carbon product comprising biogenic activated carbon and Dead Sea salt.

5. The activated carbon product of claim 4, wherein the activated carbon product consists essentially of biogenic activated carbon and Dead Sea salt.

6. The activated carbon product of claim 4 further comprising Great Salt Lake salt.

* * * * *